US009826797B2

(12) United States Patent
Elder et al.

(10) Patent No.: US 9,826,797 B2
(45) Date of Patent: Nov. 28, 2017

(54) SUPPORT STRUCTURES FOR AN ARTICLE OF FOOTWEAR AND METHODS OF MANUFACTURING SUPPORT STRUCTURES

(71) Applicant: NIKE, Inc., Beaverton, OR (US)

(72) Inventors: Zachary M. Elder, Portland, OR (US); Elizabeth Barnes, Portland, OR (US); Fred G. Fagergren, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 113 days.

(21) Appl. No.: 15/015,321

(22) Filed: Feb. 4, 2016

(65) Prior Publication Data
US 2016/0219978 A1 Aug. 4, 2016

Related U.S. Application Data

(60) Provisional application No. 62/111,706, filed on Feb. 4, 2015.

(51) Int. Cl.
*A43B 13/18* (2006.01)
*A43B 13/14* (2006.01)
(Continued)

(52) U.S. Cl.
CPC .......... *A43B 13/187* (2013.01); *A43B 13/141* (2013.01); *A43B 13/182* (2013.01);
(Continued)

(58) Field of Classification Search
CPC ..... A43B 21/26; A43B 13/181; A43B 13/182; A43B 13/183; A43B 13/185
(Continued)

(56) References Cited

U.S. PATENT DOCUMENTS 5,086,574 A * 2/1992 Bacchiocchi .......... A43B 21/26
36/28
5,743,028 A * 4/1998 Lombardino ........ A43B 13/182
36/27
(Continued)

FOREIGN PATENT DOCUMENTS

DE 19610692 A1 9/1997
FR 2969241 A1 6/2012
(Continued)

OTHER PUBLICATIONS

International Searching Authority, International Search Report for PCT/US2016/016512, dated Jun. 10, 2016.

*Primary Examiner* — Ted Kavanaugh
(74) *Attorney, Agent, or Firm* — Honigman Miller Schwartz and Cohn LLP; Matthew H. Szalach; Jonathan P. O'Brien

(57) ABSTRACT

Embodiments provide a support structure for an article of footwear, which may include upper and lower support elements, upper and lower members, a compression element disposed between the upper and lower members, and a torsion element. A vertical force applied to the upper support element compresses the compression element, rotationally displaces in a first direction the upper member relative to the lower member, rotationally displaces in the first direction a second portion of the torsion element relative to a first portion of the torsion element, deflects a torsion loading portion of the torsion element, and moves the upper member vertically toward the lower member. Upon release of the force, the torsion loading portion rotationally displaces in a second direction opposite to the first direction the second portion of the torsion element relative to the first portion. Embodiments of methods of manufacturing a support structure are also disclosed.

20 Claims, 24 Drawing Sheets

(51) Int. Cl.
  *A43B 21/26*  (2006.01)
  *F16F 1/02*   (2006.01)
  *F16F 1/10*   (2006.01)

(52) U.S. Cl.
  CPC ............ *A43B 13/183* (2013.01); *A43B 21/26* (2013.01); *F16F 1/028* (2013.01); *F16F 1/10* (2013.01)

(58) Field of Classification Search
  USPC .................................... 36/28, 30 R, 103, 39
  See application file for complete search history.

(56) References Cited

U.S. PATENT DOCUMENTS

| | | | | |
|---|---|---|---|---|
| 5,918,384 | A * | 7/1999 | Meschan | A43B 3/0042 36/27 |
| 6,331,007 | B1 * | 12/2001 | Bryce | A43B 5/00 280/11.3 |
| 8,104,193 | B1 * | 1/2012 | Teteriatnikov | A43B 5/12 36/115 |
| 8,557,157 | B2 * | 10/2013 | Nakano | A43B 1/0072 264/244 |
| 2005/0102857 | A1 | 5/2005 | Yen | |
| 2006/0213082 | A1 | 9/2006 | Meschan | |
| 2006/0254086 | A1 * | 11/2006 | Meschan | A43B 3/0042 36/25 R |
| 2006/0283046 | A1 * | 12/2006 | Mason | A43B 3/0042 36/28 |
| 2008/0289218 | A1 * | 11/2008 | Nakano | A43B 13/186 36/88 |
| 2008/0289219 | A1 * | 11/2008 | Nakano | A43B 13/186 36/88 |

FOREIGN PATENT DOCUMENTS

| | | |
|---|---|---|
| WO | WO-9814084 A1 | 4/1998 |
| WO | WO-2011001132 A2 | 1/2011 |
| WO | WO-2011030990 A1 | 3/2011 |

* cited by examiner

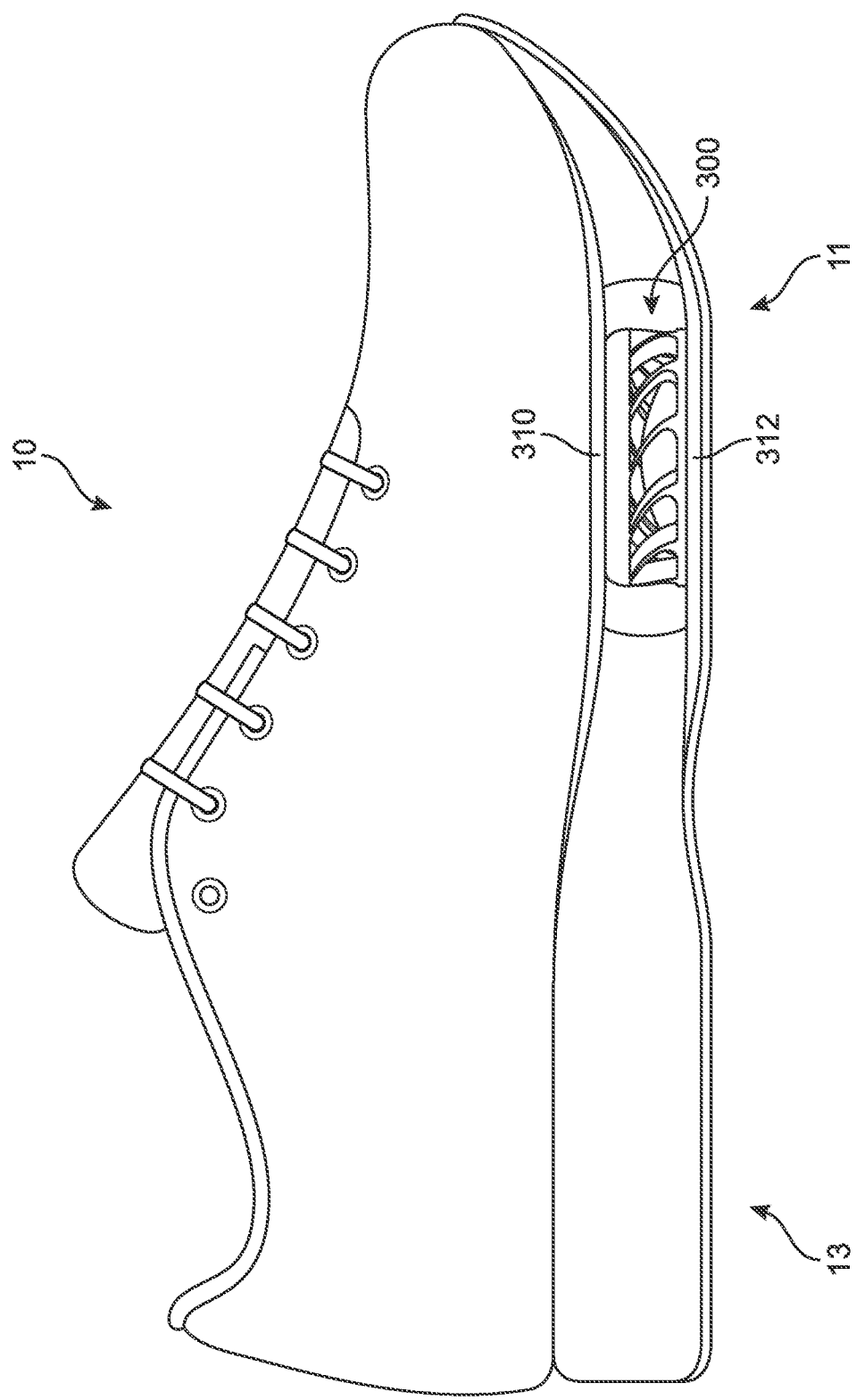

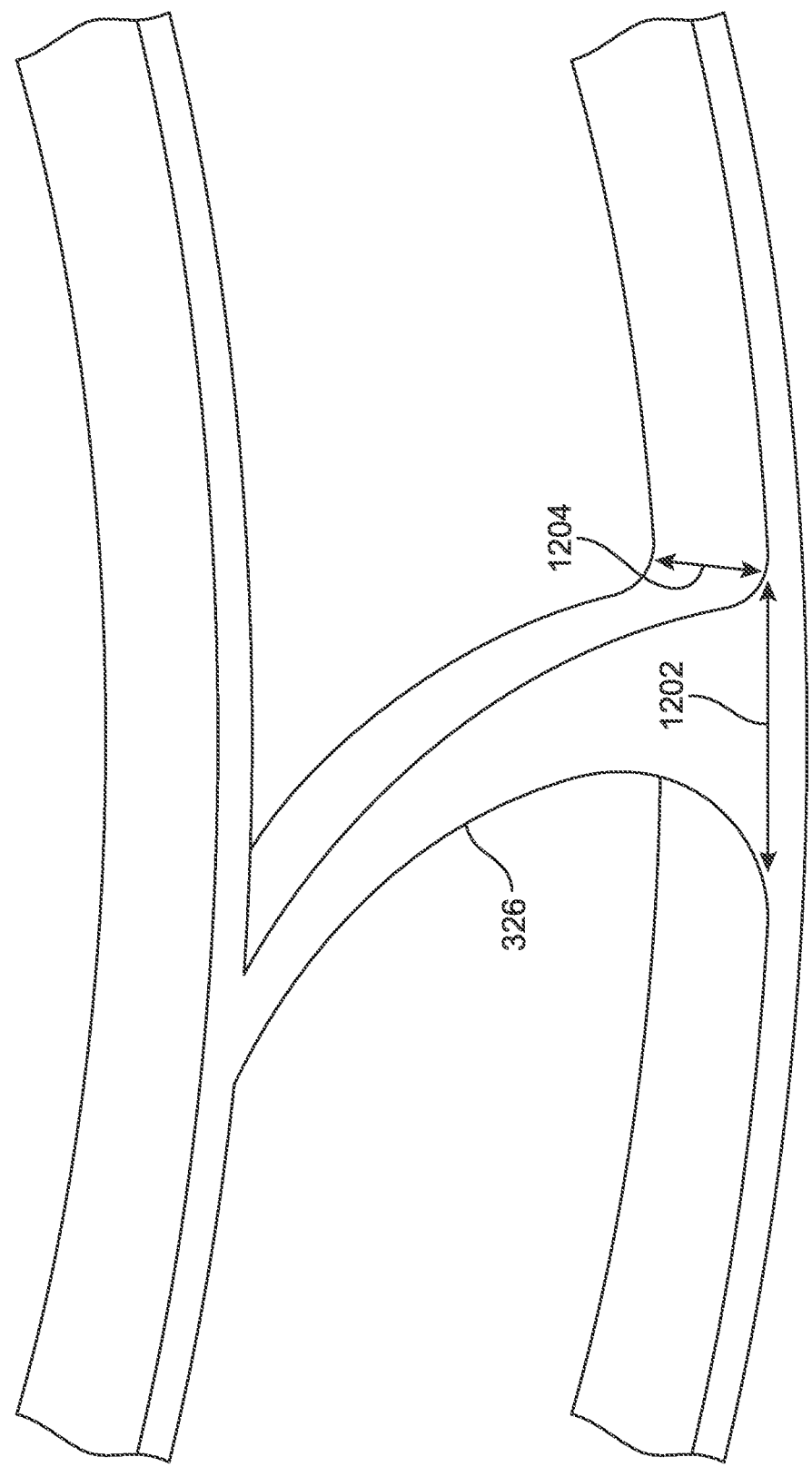

SUPPORT STRUCTURES FOR AN ARTICLE OF FOOTWEAR AND METHODS OF MANUFACTURING SUPPORT STRUCTURES

CROSS-REFERENCE TO RELATED APPLICATIONS

This application Claims the benefit of U.S. Provisional Patent Application Ser. No. 62/111,706, filed Feb. 4, 2015, the entire contents of which are hereby incorporated by reference.

FIELD

The present embodiments relate generally to support structures for articles of footwear and articles of footwear including such support structures, and in particular, to support structures having improved vertical compression and transverse stiffness characteristics.

BACKGROUND

To keep a wearer safe and comfortable, footwear is called upon to perform a variety of functions. For example, the sole structure of footwear should provide adequate support and impact force attenuation properties to prevent injury and reduce fatigue, while at the same time providing adequate flexibility so that the sole structure articulates, flexes, stretches, or otherwise moves to allow an individual to fully utilize the natural motion of the foot.

Despite the differences between the various footwear styles, sole structures for conventional footwear generally include multiple layers that are referred to as an insole, a midsole, and an outsole. The insole is a thin, cushioning member located adjacent to the foot that enhances footwear comfort. The outsole forms the ground-contacting element of footwear and is usually fashioned from a durable, wear resistant material that may include texturing or other features to improve traction.

The midsole forms the middle layer of the sole and serves a variety of purposes that include controlling potentially harmful foot motions, such as over-pronation; shielding the foot from excessive ground-reaction forces; and beneficially utilizing such ground-reaction forces for more efficient toe-off. Conventional midsoles may include a foam material to attenuate impact forces and absorb energy when the footwear contacts the ground during athletic activities. Other midsoles may utilize fluid-filled bladders (e.g., filled with air or other gasses) to attenuate impact forces and absorb energy.

Although foam materials in the midsole succeed in attenuating impact forces for the foot, foam materials that are relatively soft may also impart instability that increases in proportion to midsole thickness. For example, the use of very soft materials in the midsole of running shoes, while providing protection against vertical impact forces, can encourage instability of the ankle, thereby contributing to the tendency for over-pronation. For this reason, footwear design often involves a balance or tradeoff between impact force attenuation and stability.

Stabilization is also a factor in sports like basketball, volleyball, football, and soccer. In addition to running, an athlete may be required to perform a variety of motions including transverse movement; quickly executed direction changes, stops, and starts; movement in a backward direction; and jumping. Footwear for these activities must support these types of motion.

High-action sports, such as soccer, basketball, football, rugby, ultimate, and the like, impose special demands upon players and their footwear. Accordingly, it would be desirable to provide footwear that achieves better dynamic control of the wearer's movements, while at the same time providing impact-attenuating features that protect the wearer from excessive impact loads.

BRIEF DESCRIPTION OF THE DRAWINGS

The present embodiments can be better understood with reference to the following drawings and description. The components in the figures are not necessarily to scale, emphasis instead being placed upon illustrating the principles of the present embodiments. Moreover, in the figures, like reference numerals may designate corresponding parts throughout the different views.

FIG. 11 is a schematic diagram illustrating a side view from a lateral side, of an article of footwear having an upper and a sole structure in accordance with alternative aspects of this disclosure.

FIG. 12 is a schematic diagram illustrating a detailed view of a spring of a compression element in accordance with aspects of this disclosure.

Figure 1A:
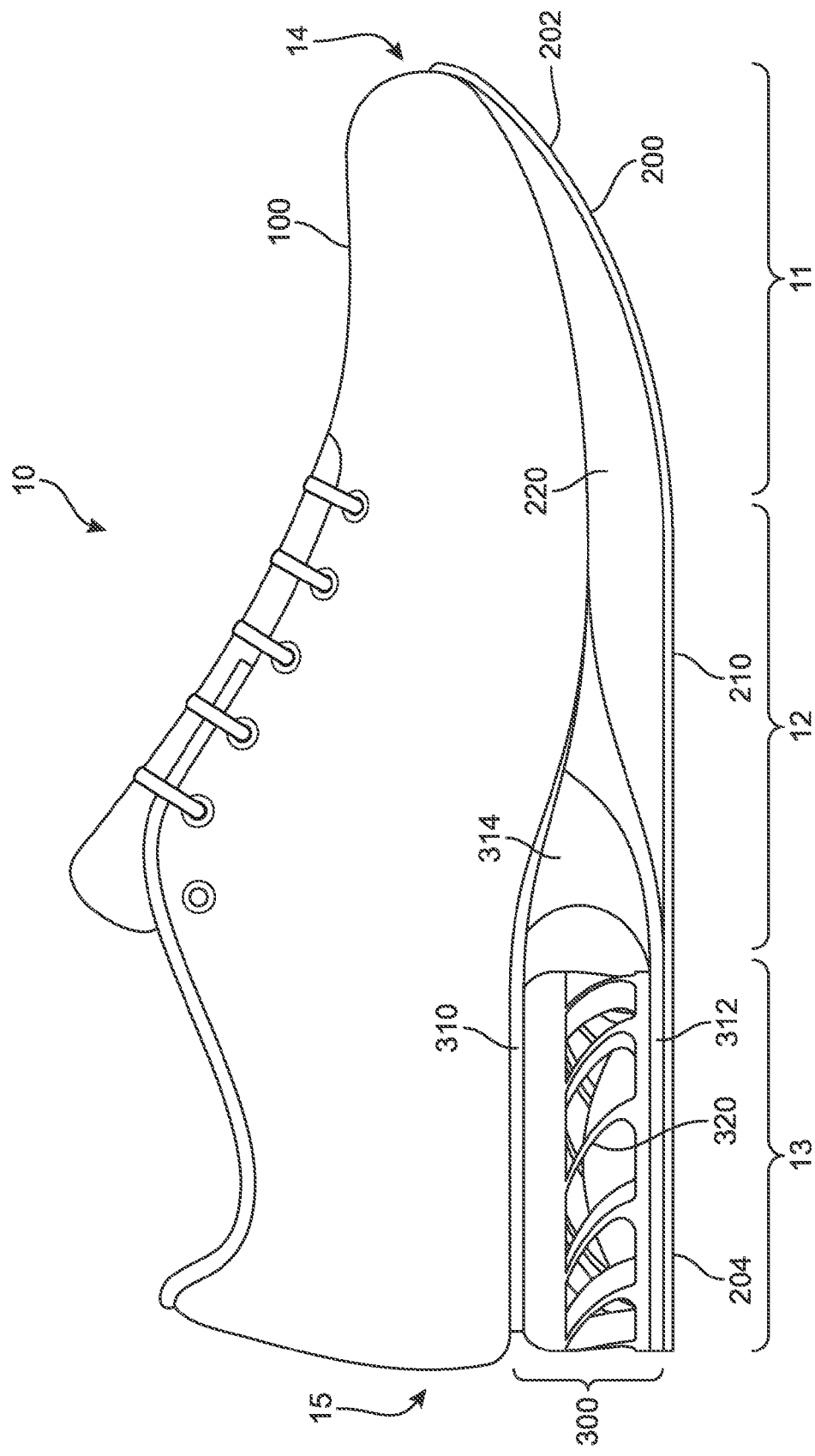
FIG. 1A is a schematic diagram illustrating a lateral side view of an article of footwear having an upper and a sole structure in accordance with aspects of this disclosure.

It should be understood that the appended drawings are not necessarily to scale, and may present a somewhat simplified representation of various features illustrative of specific aspects of the embodiments. Certain features of the illustrated embodiments may have been enlarged or distorted relative to others to facilitate visualization and clear understanding. In particular, thin features may be thickened, for example, for clarity of illustration.

DETAILED DESCRIPTION

The following discussion and accompanying figures disclose articles of footwear having sole structures in accordance with various embodiments of the present disclosure. Concepts related to the sole structures are disclosed with reference to a sole structure for an article of athletic footwear. The disclosed sole structures may be incorporated into a wide range of athletic footwear styles, including shoes that are suitable for rock climbing, bouldering, hiking, running, baseball, basketball, cross-training, football, rugby, tennis, volleyball, and walking, for example. In addition, sole structures according to various embodiments as disclosed herein may be incorporated into footwear that is generally considered to be non-athletic, including a variety of dress shoes, casual shoes, sandals, slippers, and boots. An individual skilled in the relevant art will appreciate, given the benefit of this specification, that the concepts disclosed herein with regard to the sole structure apply to a wide variety of footwear styles, in addition to the specific styles discussed in the following text and depicted in the accompanying figures.

Generally, embodiments provide an article of footwear with improved compression and transverse stiffness characteristics. Those characteristics may be provided by a support structure disposed within the sole structure of an article of footwear. The support structure may include a compression element and a torsion element. The compression element may rotate when compressed in a vertical direction, thereby loading the torsion element. Upon release of the vertical load, the loaded torsion element may torque the compression element to rotate in the opposite direction back to its original (or nearly original) rotational and vertical position.

In one aspect, a support structure for an article of footwear may include an upper support element, a lower support element, an upper member, a lower member, a compression element, and a torsion element. The upper support element and the lower support element may be fixed relative to each other. The compression element may be disposed between the upper member and the lower member. The torsion element may have a first portion, a second portion, and a torsion loading portion in between the first portion and the second portion. The first portion of the torsion element may be fixed to the upper support element and the second portion of the torsion element may be fixed to the upper member. The lower member may be fixed to the compression element and to the lower support element. A vertical force applied to the upper support element may compress the compression element, rotationally displace in a first direction the upper member relative to the lower member, rotationally displace in the first direction the second portion of the torsion element relative to the first portion of the torsion element, deflect the torsion loading portion of the torsion element, and move the upper member vertically toward the lower member. When the vertical force is released, the torsion loading portion of the torsion element may rotationally displace in a second direction opposite to the first direction the second portion of the torsion element relative to the first portion of the torsion element, such that the upper member rotationally displaces in the second direction relative to the lower member, the compression element decompresses, and the upper member moves vertically away from the lower member.

Another aspect provides a sole structure of an article of footwear having a support structure including a compression element. The compression element may include a compression loading element, such as a plurality of springs circumferentially arranged and extending between an upper ring and a lower ring. The support structure may be configured to compress when a compressive load having a vertical component is applied to the support structure.

In another aspect, an article of footwear may have an upper and a sole structure, where the sole structure includes a support structure. The support structure may include a compression element including a plurality of springs circumferentially arranged and extending between an upper ring and a lower ring. The support structure may be configured to compress when a compressive load having a vertical component is applied to the support structure.

According to certain aspects, when a compressive load having a vertical component is applied to the support structure, it may cause the upper ring to rotate relative to the bottom ring. In some aspects, the support structure further includes an upper member and a lower member. When a compressive load including a vertical component is applied to the support structure, it may also cause the upper member to rotate relative to the lower member. In some aspects, the compressive load may cause the springs to deflect and may cause the upper ring to rotate relative to the lower ring. As the springs deflect, they may pull the upper ring towards the lower ring.

According to some aspects, individual springs of the plurality of springs may be equally spaced at an angle circumferentially around the upper ring and the lower ring. Each of the plurality of springs may be identical. Each spring may have a downwardly facing concave surface. Additionally, each spring may have a larger cross-sectional area at the lower ring than a cross-sectional area thereof at the upper ring.

According to certain aspects, the upper member may include a torsion element. The upper member may also include a containment ring. In certain aspects, the torsion element may be attached to the containment ring. The torsion element may be attached to the containment ring by any conventional method, or it may be formed as one piece with the containment ring during a manufacturing process. In certain aspects, the torsion element may include a torsion loading portion, such as a plurality of spokes that are circumferentially arranged and extend between an outer ring and a central hub. Each of the plurality of spokes may be identical. Each spoke may have a curved surface facing adjacent spokes. In some aspects, each spoke may have a larger cross-sectional area at the central hub than a cross-sectional area thereof at the outer ring.

The lower member may include a compression base, which may, in some aspects, be a foam pad or a fluid-filled bladder. A center of the lower member may be axially aligned with a center of the upper member. In some aspects, the support structure may further include an upper plate. The upper plate may be secured above the upper member. Also, the upper plate may be configured as a heel support element (e.g., a heel cup). In some aspects, the upper plate may include a positioning stub. The positioning stub may secure the upper plate to the upper member. In certain aspects, the support structure may also include a lower plate that may be secured below and to the lower member.

The support structure may be located in a heel region and/or in a forefoot region of the sole structure. The circular body, the upper ring, and the lower ring of the support structure may be formed as a one-piece construction.

In another aspect, a support structure for an article of footwear may include a lower support element, a compression base attached to the lower support element, a compression element at least partially surrounding the compression base and including a plurality of springs circumferentially arranged and extending between an upper ring and a lower ring, a containment ring attached to the upper ring of the compression element, and a torsion element engaged or integrally formed with the containment ring, the torsion element including a torsion loading portion (e.g., a plurality of spokes) extending between an outer ring and a central hub, and a heel support element (e.g., a heel cup) attached to the central hub of the torsion element.

Another aspect provides a method of manufacturing a support structure for an article of footwear. The method may include fixing an upper support element to a lower support element, disposing an upper member adjacent to the upper support element, disposing a lower member adjacent to the lower support element, disposing a compression element between the upper member and the lower member, fixing a first portion of a torsion element to the upper support element, wherein the torsion element has the first portion, a second portion, and a torsion loading portion in between the first portion and the second portion, fixing the second portion of the torsion element to the upper member, fixing the lower member to the compression element, and fixing the lower member to the lower support element.

In another aspect, a vertical force applied to the upper support element may compress the compression element, rotationally displace in a first direction the upper member relative to the lower member, rotationally displace in the first direction the second portion of the torsion element relative to the first portion of the torsion element, deflect the torsion loading portion of the torsion element, and move the upper member vertically toward the lower member. When the vertical force is released, the torsion loading portion of the torsion element may rotationally displace in a second direction opposite to the first direction. The second portion of the torsion element may move relative to the first portion of the torsion element, such that the upper member rotationally displaces in the second direction relative to the lower member, the compression element decompresses, and the upper member moves vertically away from the lower member.

In another aspect, the method may further include attaching the support structure to an upper of the article of footwear.

Other systems, methods, features, and advantages of the present embodiments will be, or will become, apparent to one with skill in the art upon examination of the following figures and detailed description. It is intended that all such additional systems, methods, features, and advantages be included within this description, be within the scope of the present embodiments, and be protected by the following claims.

Generally, embodiments provide an article of footwear with improved compression and transverse stiffness characteristics.

Sports generally involve consistent pounding of the foot and/or periodic high vertical impact loads on the foot. Thus, a sole structure for an article of footwear having an impact-attenuation system capable of handling high-impact loads may be desired. Additionally, however, many sports involve transverse movements that are separate from the movements that involve large vertical impact loads. It may be desirable to have a relatively soft transverse stiffness characteristic (for example, to aid in cutting), while at the same time have a robust vertical impact-attenuation characteristic. Optionally, it may be desirable to have a relatively unforgiving transverse stiffness characteristic (for example, to provide greater stability), while at the same time have a relatively compliant vertical impact-attenuation characteristic. Thus, it may be advantageous to have a sole structure that "decouples" the vertical stiffness characteristic from the transverse stiffness characteristic. In this context, "decouple" refers to characteristics that may be determined independently, or substantially independently, of each other. Accordingly, a decoupled sole structure may provide a vertical stiffness response that is independent of (or substantially independent of) the transverse stiffness response. It may be advantageous to have such a decoupled sole structure located in the forefoot region of the footwear. It may be particularly advantageous to have such a decoupled sole structure located in the heel region of the footwear.

As noted above, according to certain aspects, it may be advantageous to have a sole structure that decouples the vertical stiffness characteristic from a side-to-side transverse stiffness characteristic. For certain specific applications, it may even be advantageous to have a sole structure that decouples the vertical stiffness characteristic from a front-to-back transverse stiffness characteristic.

Various aspects of this disclosure relate to articles of footwear having a sole structure with a support structure designed to decouple its vertical stiffness characteristics from its transverse stiffness characteristics. Thus, according to certain embodiments, it would be desirable to tailor footwear to provide an optimum (or desired) amount of protection against vertical impact loads, yet at the same time provide an optimum (or desired) amount of transverse flexibility/stability.

As used herein, the terms "upper," "lower," "top," "bottom," "upward," "downward," "vertical," "horizontal," "longitudinal," "transverse," "front," "back," "forward," "rearward," and the like, unless otherwise defined or made clear from the disclosure, are relative terms meant to place the various structures or orientations of the structures of the article of footwear in the context of an article of footwear worn by a user standing on a flat, horizontal surface. "Transverse" refers to a generally horizontal (i.e., medial-to-lateral or heel-to-toe) orientation (as opposed to a generally vertical orientation). "Lateral" refers to a generally medial-to-lateral (i.e., side-to-side) transverse orientation. "Longitudinal" refers to a generally heel-to-toe (i.e., front-to-back) transverse orientation.

As used herein, the terms "attached," "affixed," "secured," and the like are used interchangeably to describe an element of the article of footwear being joined or fastened to, or formed integrally with, a second element of the article of footwear.

Figure 1B:
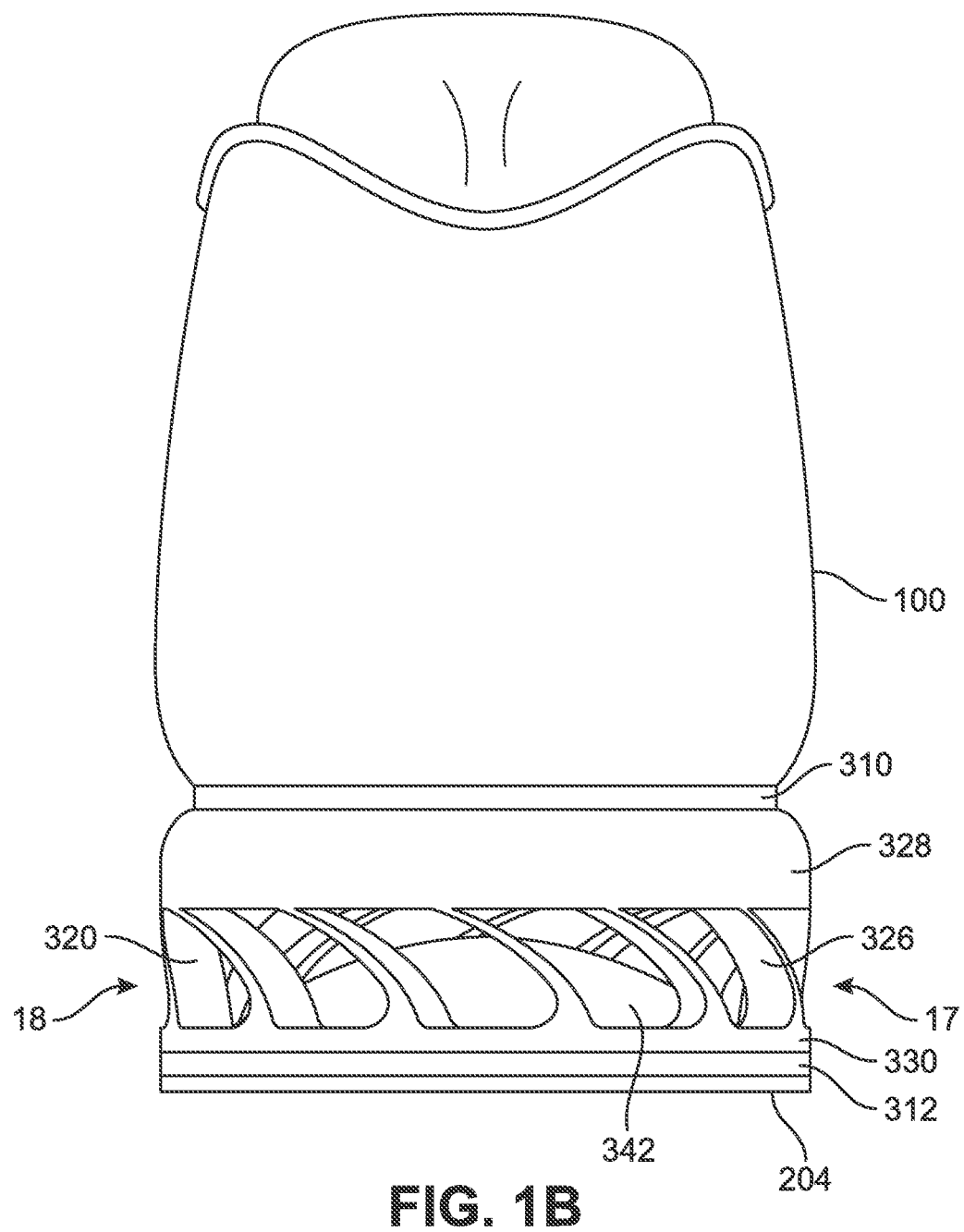
FIG. 1B is a schematic diagram illustrating a rear view of the article of footwear of FIG. 1A.

Referring to FIGS. 1A-1B, an article of footwear 10 generally includes two primary components: an upper 100 and a sole structure 200. Upper 100 is secured to sole structure 200 and forms a void on the interior of footwear 10 for comfortably and securely receiving a foot. Sole structure 200 is secured to a lower portion of upper 100 and is positioned between the foot and the ground. Upper 100 may include an ankle opening that provides the foot with access to the void within upper 100. As is conventional, upper 100 may also include a vamp area having a throat and a closure mechanism, such as laces.

Typically, sole structure 200 of the article of footwear 10 has a forefoot region 11, a midfoot region 12, and a heel region 13. Although regions 11-13 apply generally to sole structure 200, references to regions 11-13 may also apply to the article of footwear 10, upper 100, sole structure 200, or an individual component within either sole structure 200 or upper 100.

Sole structure 200 of the article of footwear 10 further has a toe or front edge 14 and a heel or back edge 15. A lateral edge 17 and a medial edge 18 each extend from the front edge 14 to the back edge 15. Further, sole structure 200 of the article of footwear 10 defines a longitudinal centerline extending from the back edge 15 to the front edge 14 and located generally midway between the lateral edge 17 and the medial edge 18. Longitudinal centerline generally bisects sole structure 200, thereby defining a lateral side (the outside edge of the foot) and a medial side (the inside edge of the foot).

According to certain aspects and referring to FIGS. 1A-1B, sole structure 200 includes a forward portion 202 and a rearward portion 204. Forward portion 202 may encompass forefoot region 11 and some or all of midfoot region 12. Rearward portion 204 may encompass heel region 13 and some or all of midfoot region 12. Thus, some portion of forward portion 202 and/or rearward portion 204 of sole structure 200 may be located in the midfoot region 12. In this particular configuration, forward portion 202 includes a conventional midsole structure 220 and a conventional outsole structure 210. Rearward portion 204 includes a support structure 300.

Referring to FIG. 1A, sole structure 200 may include multiple layers and/or multiple components. For example, forward portion 202 may include an outsole structure 210 and a midsole structure 220, and may include an insole (not shown). Outsole structure 210 may form the ground-engaging portion (or other contact surface-engaging portion) of sole structure 200, thereby providing traction and a feel for the engaged surface. Outsole structure 210 may also assist in providing stability and localized support for the foot. Even further, outsole structure 210 (and in some instances, insole) may assist in providing impact force attenuation capabilities.

Outsole structure 210 may be formed of conventional outsole materials, such as natural or synthetic rubber or a combination thereof. The material may be solid, foamed, filled, and the like or a combination thereof. One particular rubber for use in outsole structure 210 may be an OGRS rubber. Another particular composite rubber mixture may include approximately 75% natural rubber and 25% synthetic rubber such as a styrene-butadiene rubber. Other suitable polymeric materials for the outsole structure include plastics, such as PEBAX® (a poly-ether-block co-polyamide polymer available from Atofina Corporation of Puteaux, France), silicone, thermoplastic polyurethane (TPU), polypropylene, polyethylene, ethylvinylacetate, styrene ethylbutylene styrene, and the like. Optionally, outsole structure 210 may also include fillers or other components to tailor its hardness, wear, durability, abrasion-resistance, compressibility, stiffness, and/or strength properties. Thus, for example, outsole structure 210 may include reinforcing fibers, such as carbon fibers, glass fibers, graphite fibers, aramid fibers, basalt fibers, and the like.

Further, outsole structure 210 may include a ground-contacting lower layer that is formed separately from the other portions of outsole structure 210 and subsequently integrated therewith. The ground-contacting lower layer may be formed of an abrasion resistant material that may be co-molded, laminated, adhesively attached, or applied as a coating to form a lower surface of outsole 210.

Referring back to FIG. 1A, forward portion 202 of sole structure 200 may also include a midsole structure 220. Midsole structure 220 may be positioned between outsole structure 210 and upper 100. Midsole structure 220 may be secured to upper 100 along the lower length of the upper 100 in any conventionally known manner, including via cements or adhesives or by mechanical connectors.

In general, a conventional midsole structure 220 may have a resilient, polymer foam material, such as polyurethane or ethylvinylacetate. The foam may extend throughout the length and width of the forward portion 202. In general, a relatively thick foam layer will provide greater impact force attenuation than a relatively thin foam layer, but it will also have less stability than the relatively thin foam layer.

Optionally, a conventional midsole structure may incorporate sealed chambers, fluid-filled bladders, channels, ribs, columns, or other supports (with or without voids), and the like.

An optional insole (or sockliner) is generally a thin, compressible member located within the void for receiving the foot and proximate to a lower surface of the foot. Typically, the insole, which is configured to enhance footwear comfort, may be formed of foam, and optionally a foam component covered by a moisture wicking fabric or textile material. Further, the insole or sockliner may be glued or otherwise attached to the other components of sole structure 200 or upper 100 (e.g., to a strobel member), although it need not be attached, if desired.

According to certain aspects and referring to FIGS. 1A-1B, rearward portion 204 of sole structure 200 may include support structure 300. According to certain aspects, support structure 300 may decouple, or at least partially decouple, a vertical compressive stiffness characteristic of the support structure 300 from a transverse stiffness/stability characteristic thereof.

Figure 2A:
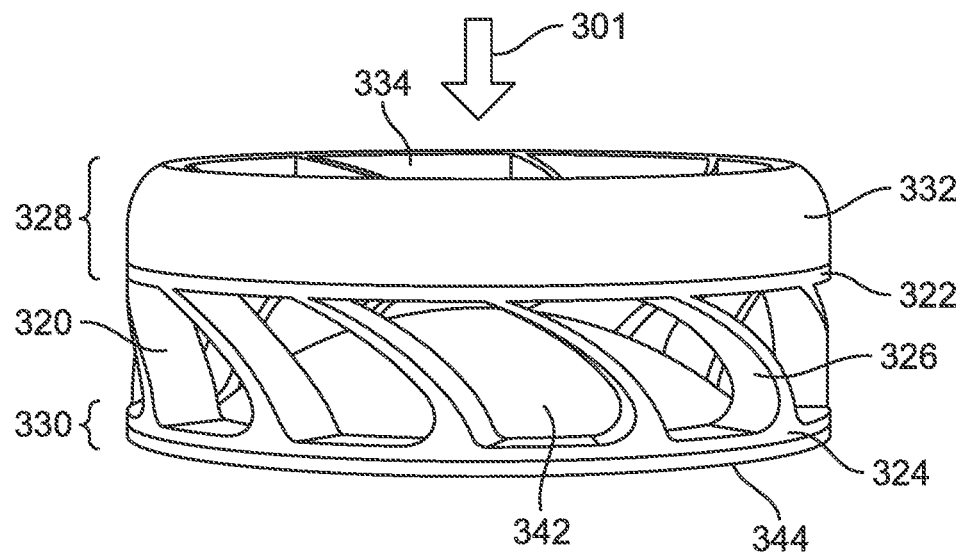
FIG. 2A is a schematic diagram illustrating a side perspective view of a support structure in accordance with aspects of this disclosure.

According to the particular embodiment illustrated in FIGS. 1A-1B, support structure 300 may include a compression element 320. As shown in FIG. 2A, compression element 320 may include an upper or first ring 322 fixed for movement with the outer ring 336, a lower or second ring 324 fixed for movement with the outsole structure 210, and a compression loading element that absorbs forces associated with movement of the upper ring 322 toward the lower ring 324. The compression loading element may have any number of different configurations that provide flexibility such that when a downward force is applied to the support structure 300, the compression loading element may be compressed. In certain aspects, the compression loading element may be a plurality of springs 326. The plurality of springs 326 may have a variety of shapes and sizes and may permit selective relative movement between the upper ring 322 and the lower ring 324. The plurality of springs 326 may be circumferentially arranged as they extend between upper ring 322 and lower ring 324.

Figure 2B:
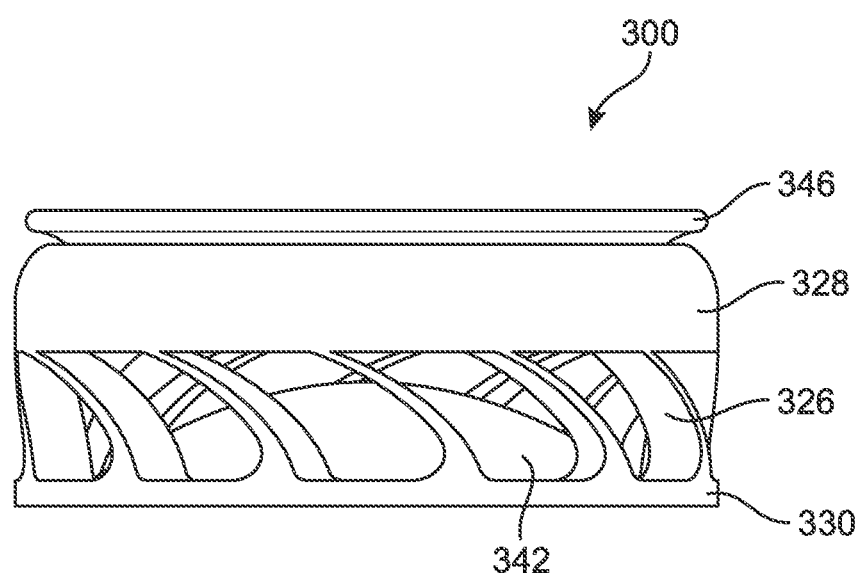
FIG. 2B is a schematic diagram illustrating a side perspective view of a support structure in accordance with aspects of this disclosure.
Figure 2C:
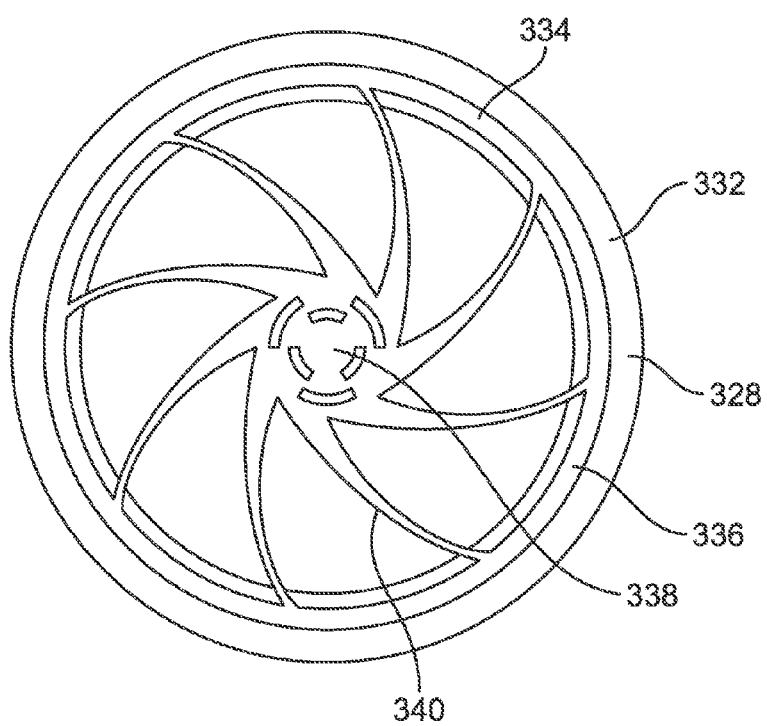
FIG. 2C is a schematic diagram illustrating a top view of the support structure of FIG. 2A.

As shown in FIG. 2A, support structure 300 may also include a torsion element 334 and a containment ring 332. The compression element 320 may be attached to the containment ring 332. The torsion element 334 may be enclosed by, and attached to, the containment ring 332, and may also be attached to the compression element 320. The upper ring 322, containment ring 332, and torsion element 334 may together provide an upper member. As an alternative to the separate upper ring 322 and containment ring 332, an embodiment may provide the support structure 300 with an upper member 328, as shown in FIG. 2B. Upper member 328 may be integral with compression element 320. Upper member 328 may be attached to or integral with torsion element 334. Upper member 328 may be positioned above (or even partially within) compression element 320.

As shown in FIG. 2A, support structure 300 may also include a lower plate 344 attached to the lower ring 324 of the compression element 320. As an alternative to the separate lower ring 324 and lower plate 344, an embodiment may provide the support structure 300 with a lower member 330, as shown in FIG. 2B.

As shown in both FIGS. 2A and 2B, support structure 300 may also include a compression base 342. Compression base 342 may be attached to one or more of the compression element 320 and the lower plate 344. Compression base 342 may be disposed within the springs 326 of the compression element 320.

As shown in FIG. 2B, support structure 300 may also include an upper plate 346 secured to torsion element 334 as described in more detail below.

Still referring to FIGS. 2A-2D, when a force 301 is applied downward to support structure 300 (for example, by the heel of a user of the article of footwear), upper ring 322 of compression element 320 may move downward while rotating relative to lower ring 324. The rotation of upper ring 322 may, in some instances, also cause the outer portion of torsion element 334 to rotate relative to lower ring 324.

Figure 3:
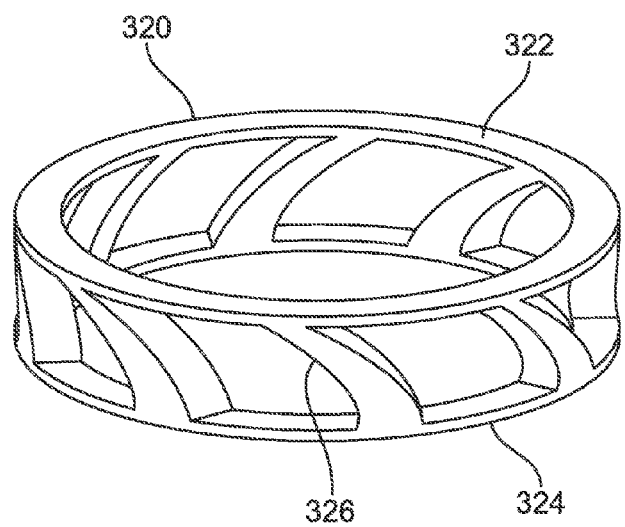
FIG. 3 is a schematic diagram illustrating a perspective view of a compression element in accordance with aspects of this disclosure.

Referring to FIG. 3, compression element 320 may be formed as a circular, generally ring-like element. According to certain aspects and referring to FIG. 3, a plurality of springs 326 may extend between upper ring 322 and lower ring 324. Springs 326 may be generally equally circumferentially spaced as they extend between upper ring 322 and lower ring 324, although equal spacing is not required in all example structures according to the present embodiments. Springs 326 may also be angularly spaced around upper ring 322 and lower ring 324, i.e., a spring attached at one location on lower ring 324 may be correspondingly attached at a location on upper ring 322 that is not perpendicular to the lower attachment point. Springs 326 may be generally curved, e.g., concavely-curved downward, facing lower ring 324. Although not a requirement, in some aspects the cross-sectional area of springs 326 will be greater at or near the lower ring 324 as compared to at or near the upper ring 322, e.g., the spring cross-sectional area may decrease as the springs extend from lower ring 324 to upper ring 322 such that springs 326 may have a cross-sectional area that is larger in size at the bottom of the springs 326 than at the top.

Referring to FIG. 2A-2D, support structure 300 may include an upper member 328 and a lower member 330. Upper member 328 may be positioned at the top of compression element 320. Lower member 330 may be positioned at the bottom of compression element 320. The center of upper member 328 may be axially aligned with the center of lower member 330. In certain aspects, upper member 328 and lower member 330 are secured to upper ring 322 and lower ring 324, respectively. Upper member 328 and lower member 330 may be secured to compression element 320 by any conventionally known method. Non-limiting examples of known securing methods include, for example, glue, adhesive, tape, fasteners, and the like. In alternative aspects, upper member 328 and/or lower member 330 may be formed with compression element 320 during the manufacturing process, i.e., upper member 328 and/or lower member 330 may be of one-piece construction with compression element 320. Upper member 328 and lower member 330 may be positioned above and below (or even partially within), respectively, of compression element 320.

Figure 4A:
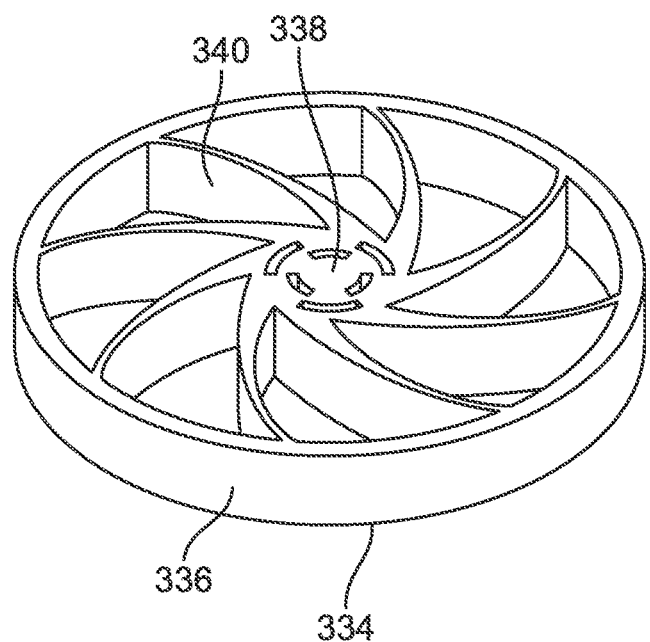
FIG. 4A is a schematic diagram illustrating a perspective view of a torsion element in accordance with aspects of this disclosure.
Figure 4B:
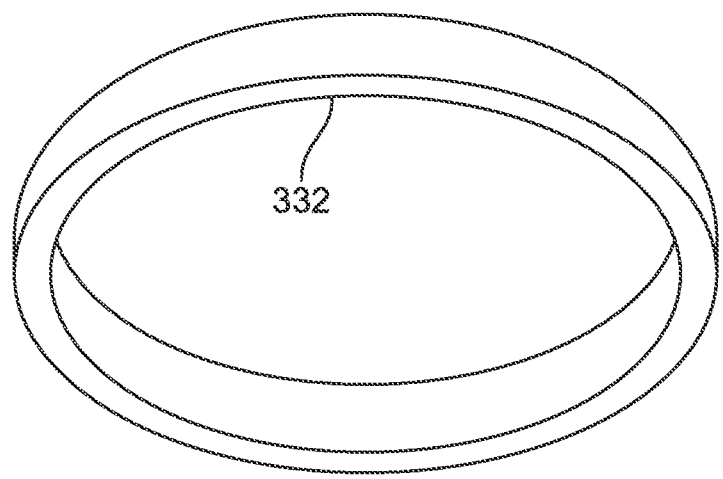
FIG. 4B is a schematic diagram illustrating a perspective view of a containment ring in accordance with aspects of this disclosure.

According to certain aspects and referring to FIG. 4A-4B, upper member 328 may include a containment ring 332. In some aspects, the geometry of containment ring 332 may be modified. The modification of the geometry of containment ring 332 may increase the strength of containment ring 332 so as to prevent containment ring 332 from collapsing during use of support structure 300. For example, in one aspect, containment ring 332 may have a rib around the outer surface of containment ring 332. In other aspects, containment ring 332 may be made from a rigid material, such as carbon fiber reinforced plastic, glass fiber reinforced plastic, PEBAX, other polymers, and the like.

In certain aspects, upper member 328 may include a torsion element 334 with the containment ring 332. In alternative aspects, upper member 328 may include only a torsion element 334. In certain aspects torsion element 334 may include a torsion loading portion. The torsion loading portion may have any number of different configurations that provide flexibility such that when a downward force is applied to support structure 300 the torsion loading portion may be flexed. In certain aspects, the torsion loading portion may be made of resilient material, so that the torsion loading portion is deformable and elastic. In certain aspects, the torsion loading portion may be spokes (e.g., configured to have concave curves, convex curves, or compound curves), ribs (e.g., configured to have a ring or closed loop, such as an inner ring and/or outer ring, that may be circular or serpentine), and the like. In certain aspects, torsion loading portion may be a plurality of spokes 340 extending between an outer ring 336 and a central hub 338. The plurality of spokes 340 may have a variety of sizes and shapes and may radiate from the central hub 338 to permit selective rotation of the outer ring 336 relative to the central hub 338. In certain aspects, spokes 340 may extend from central hub 338 in the same plane. In alternative aspects, spokes 340 may extend from central hub 338 at an angle whereby central hub 338 may be in a different plane than spokes 340, i.e., central hub 338 may be located above spokes 340 or below spokes 340. In some instances, spokes 340 are generally equally spaced extending between outer ring 336 and central hub 338, although non-equal spacing may be used, if desired. Although not a requirement, the cross-sectional area of spokes 340 may be greater at or near central hub 338 as compared to at or near outer ring 336, e.g., the spoke cross-sectional area may decrease as spokes 340 extend from central hub 338 to outer ring 336 such that spokes 340 may have a larger cross-section at central hub 338 than at outer ring 336. Spokes 340 may be generally curved, e.g., concavely-curved sideways, facing adjacent spokes of the torsion element.

Torsion element 334 may be secured within containment ring 332. In some aspects, torsion element 334 may be attached to containment ring 332. For example, an outer surface of torsion element 334 may be secured to an inner surface of containment ring 332. Torsion element 334 may be secured to containment ring 332 by any conventional method, e.g., by cements or adhesives, by mechanical connectors, and the like. In alternative aspects, torsion element 334 may be secured within containment ring 332 by a compression or friction fit. Further, in alternative aspects, torsion element 334 may be formed with containment ring 332 during the manufacturing process, i.e., torsion element 334 and containment ring 332 may be formed as one piece during construction. Torsion element 334 may be, in some instances, affixed to upper ring 322 of compression element 320. In alternative aspects, torsion element 334 may be formed with upper ring 322 during the manufacturing process, i.e., may be formed as one piece during construction.

In some aspects, support structure 300 may include one or more compression elements 320 and/or one or more torsion elements 334. In some aspects and referring to FIG. 8A, support structure 300 may include a first compression element 320a and a second compression element 320b. First compression element 320a may be secured to a lower surface of second compression element 320b. In certain aspects, a pad 321 may be located between first compression element 320a and second compression element 320b. An upper surface of first compression element 320a may be secured to pad 321, and a lower surface of second compression element 320b may be secured to pad 321. Non-limiting examples of suitable materials for pad 321 include natural rubber, synthetic rubber, polyurethane foams, ethylvinylacetate foams, plastics, silicone, thermoplastic polyurethane (TPU), polyurethane, polypropylene, polyethylene, ethylvinylacetate, styrene ethylbutylene styrene, and the like.

Figure 8A:
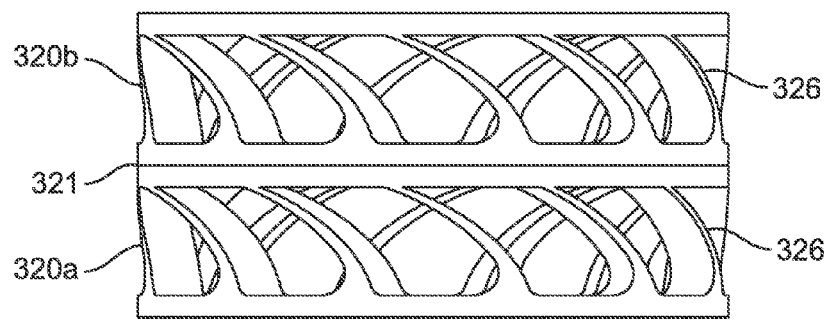
FIGS. 8A and 8B are schematic diagrams illustrating side perspective views of support structures in accordance with alternative aspects of this disclosure.

As shown in FIG. 8A, first compression element 320a and second compression element 320b may be configured to rotate in the same direction when under vertical compression. For example, as shown, each of the springs 326 of both compression elements 320a and 320b may curve in a clockwise direction so that both compression elements 320a and 320b rotate in a clockwise direction when under vertical compression. The combined effect of the compression elements 320a and 320b may enhance rotation and the cushioning effect of a vertical compression.

Figure 8B:
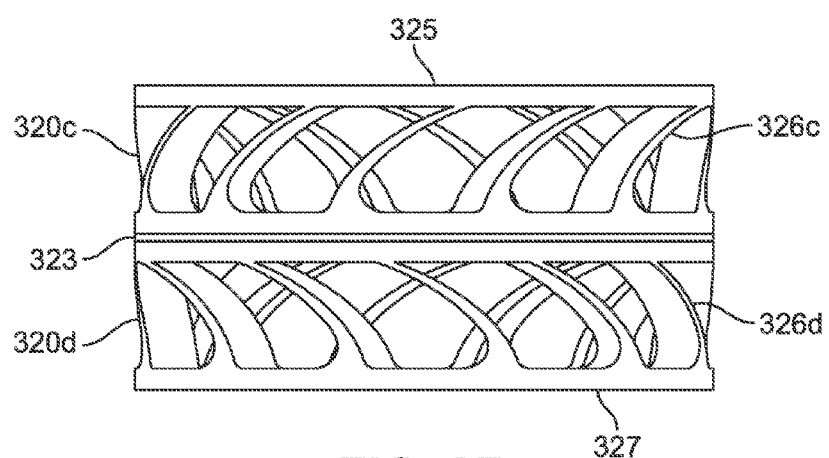

In an alternative embodiment, as shown in FIG. 8B, a first compression element 320c and a second compression element 320d may be configured to rotate in opposite directions when under vertical compression. For example, as shown, springs 326c of the first compression element 320c may curve in a counterclockwise direction, while springs 326d of the second compression element 320d may curve in a clockwise direction. The upper end 325 of the first compression element 320c may be attached to the article of footwear (e.g., the upper) and the lower end 327 of the second compression element 320d may also be attached to the article of footwear (e.g., the outsole structure). A joining member 323 may join the first compression element 320c to the second compression element 320d. The joining member 323 may be a web extending across the width of the compression elements 320c and 320d. With this configuration, equal and opposite rotation may be achieved through the middle of the structure. In addition, in countering the rotation of the second compression element 320d, the first compression element 320c may act as a torsion element, as described herein. Accordingly, the first compression element 320c may supplement or replace a torsion element in a support structure. In an embodiment in which the first compression element 320c supplements a torsion element, the torsion element may be disposed between the first compression element 320c and the second compression element 320d to assist with returning the second compression element 320d to its original position after a vertical compression force is released. The torsion element may be the joining member 323 or may be attached to the joining member 323.

Figure 5:
FIG. 5 is a schematic diagram illustrating a perspective view of a compression base in accordance with aspects of this disclosure.

According to certain aspects and referring to FIG. 5, a support structure 300 may include a compression base 342. Compression base 342 may be constructed of a material that provides cushioning. As non-limiting examples, suitable materials for a compression base may include foams, soft silicon, soft elastomers, and the like. In certain aspects, compression base 342 may be a foam pad, a fluid-filled bladder, and the like. Compression base 342 may have a preformed shape, such as, for example, a dome shape, a raised platform or mesa-type structure, a donut shape, or a flat cylinder. The dome of a shaped compression base 342 may extend upwards into compression element 320, an example configuration of which is shown in FIG. 2A. The apex of the dome shaped compression base 342 may be level with upper ring 322 of compression element 320 or lower than the upper ring 322.

In operation, compression base 342 may provide supplemental cushioning in response to a vertical compression of a support structure 300. As the compression element 320 compresses downward, the torsion element 334 may contact an engagement surface of the compression base 342, which may supplement the vertical cushioning provided by the compression element 320. The engagement surface may oppose the torsion element 334 such that when the torsion element 334 is moved a predetermined distance relative to the lower ring 324 of the compression element 320, the torsion element 334 contacts the engagement surface. This supplemental cushioning may prevent the compression loading elements (e.g., springs 326) from bottoming out, thereby avoiding a condition in which the compression loading elements are fully compressed and are not providing any cushioning. Instead, the compression base 342 may stop the further compression of the compression loading elements and provide at least some vertical cushioning. In contacting the descending torsion element 334, the compression base 342 may also arrest further rotation of the torsion element 334 at a desired point.

In alternative embodiments, a compression base may be disposed on, and travel with, the torsion element 334. For example, a compression base may be attached to, and protrude downwardly from, the underside of torsion element 334. Thus, as a support structure is vertically compressed and a torsion element is compressed downwardly, the compression base may contact a lower surface and provide supplemental cushioning, as well as arrest further rotation of the torsion element 334. The lower surface may be, for example, a lower support element 312 or an outsole structure 210 as shown in FIG. 1A, or may be a lower plate 344 as shown in FIG. 2A. Examples of these alternative embodiments of a compression base are shown in the cross-sectional views of FIGS. 17A and 17B.

Figure 17A:
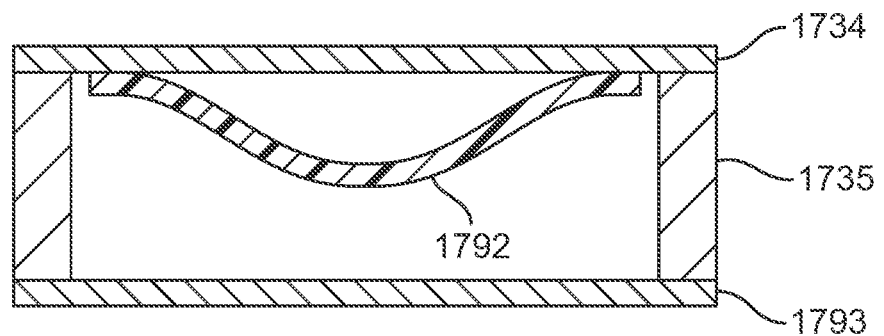
FIGS. 17A and 17B are schematic diagrams illustrating alternative embodiments of a compression base in accordance with aspects of this disclosure.

As shown in FIG. 17A, a compression base 1792 may be attached to, and protrude downwardly from, a torsion element 1734. Compression base 1792 may have a rounded convex cross-sectional shape and may be made of resilient material, so that when the compression base 1792 contacts a lower surface 1793, the compression base 1792 deforms and provides supplemental cushioning in response to a vertical force applied to the support structure. Upon release of the vertical force, the resilient compression base 1792 may assist the compression loading elements in returning the compression element 1735 to its original uncompressed position.

Figure 17B:
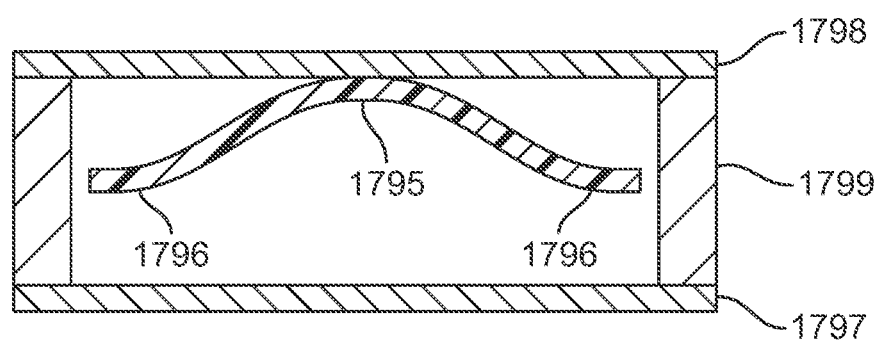

In another embodiment, as shown in FIG. 17B, a compression base 1795 may include resilient arms 1796 attached to, and protruding downwardly from, a torsion element 1798. The arms 1796 may deflect when contacting a lower surface 1797, to provide supplemental cushioning in response to a vertical force applied to a support structure. Upon release of the vertical force, the resilient arms 1796 may assist the compression loading elements in returning the compression element 1799 to its original uncompressed position.

Figure 2D:
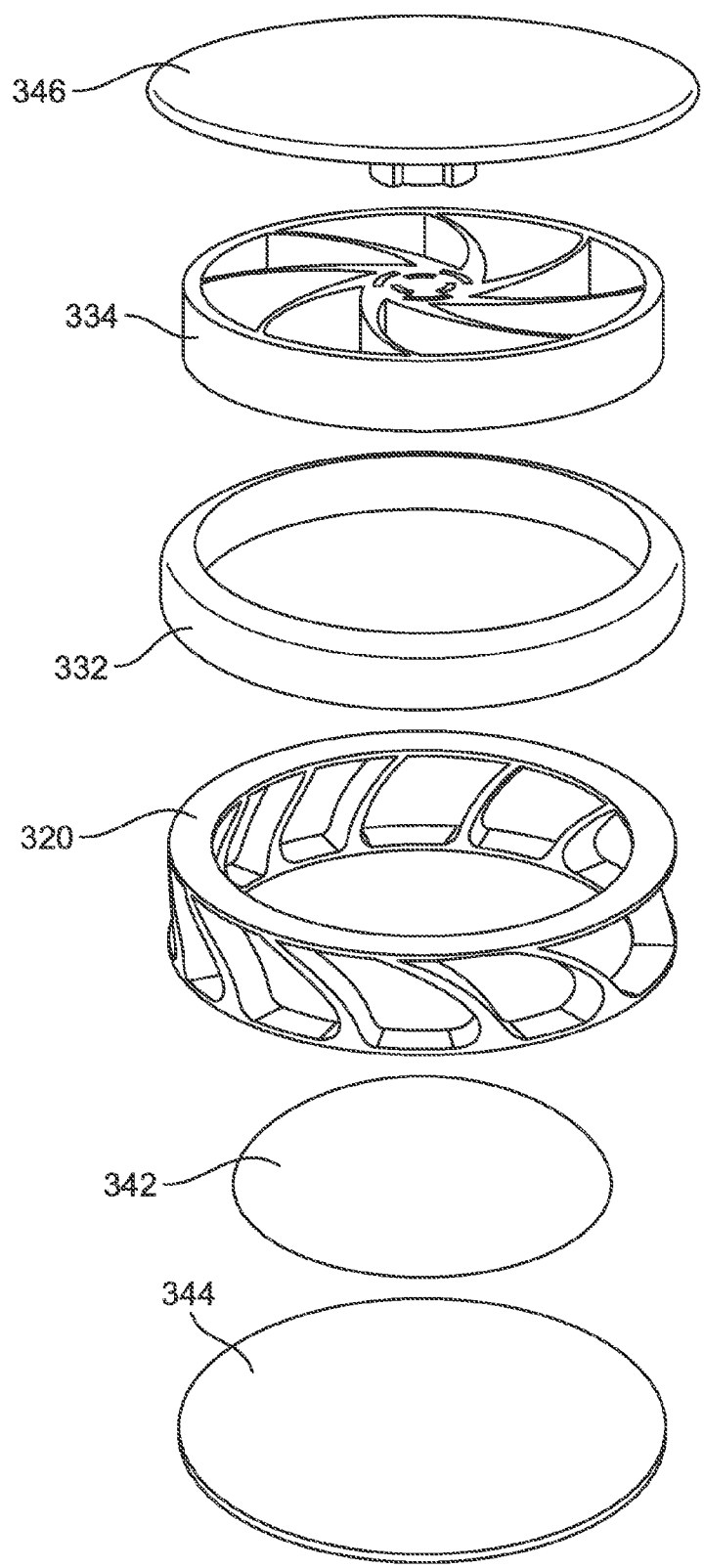
FIG. 2D is an exploded perspective view of the support structure of FIG. 2A.
Figure 6:
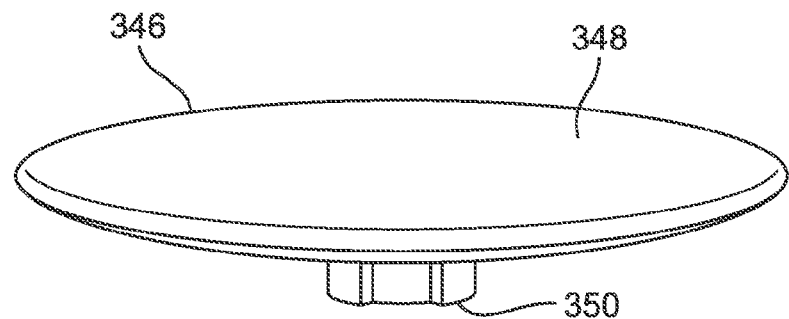
FIG. 6 is a schematic diagram illustrating a perspective view of an upper plate in accordance with aspects of this disclosure.
Figure 7:
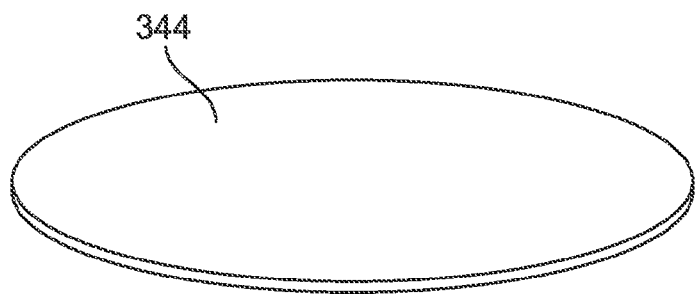
FIG. 7 is a schematic diagram illustrating a perspective view of a lower plate in accordance with aspects of this disclosure.

In certain aspects and referring to FIGS. 6 and 7, support structure 300 may include upper plate 346 and/or lower plate 344. Upper plate 346 and lower plate 344 may each, in some aspects, be circular in shape (although other shapes, including non-regular shapes, are possible). In some aspects, the center of lower plate 344 may be axially aligned with the center of upper plate 346. Lower plate 344 may have an upper surface and a lower surface. The upper surface of lower plate 344 may be affixed to a lower surface of lower member 330 by any known securing method (e.g., cements or adhesives, mechanical connectors, and the like). In some aspects, lower plate 344 may be formed with lower member 330 during the manufacturing process, i.e., lower plate 344 and lower member 330 may be formed as one piece during construction. Upper plate 346 may be configured as a heel cup having a concave surface 348. Concave surface 348 may be shaped to receive the heel of a user. Upper plate 346 may include a positioning stub 350 located at the center of upper plate 346. In some instances, positioning stub 350 may extend downwards towards upper member 328, and away from concave surface 348. Positioning stub 350 may align with and engage central hub 338 of torsion element 334, for example, by protrusions on the stub 350 fitting inside slots on the hub 338 as shown in FIG. 2D. Positioning stub 350 may mate, and in some aspects lock or otherwise engage, upper plate 346 to upper member 328. In certain aspects, positioning stub 350 may facilitate assembly of the support structure 300. If a transverse movement (such as when a cutting action takes place) is applied to the portion of the footwear 10 in the region of upper plate 346, i.e., a heel cup, the edges of the heel cup may tilt in response to the transverse movement.

As an alternative to the protrusions of positioning stub 350 and the slots of central hub 338, central hub 338 of torsion element 334 may be attached to the article of footwear in any number of ways. For example, central hub 338 may be glued to upper plate 346. As another example, central hub 338 may be attached to upper plate 346 by injection molding the torsion element 334 and the upper plate 346 together as one monolithic part. Notwithstanding the particular benefits of the exemplary connections disclosed herein, it should be understood that present embodiments cover any connection that securely fixes the central hub of the torsion element to the article of footwear and allows movement of the remaining portions of the torsion element relative to the article of footwear.

In some aspects, support structure 300 may be horizontal, or in alternative aspects, may be angled such that one side of support structure 300 is larger than the opposing side of support structure 300. For example, the rear of support structure 300, located in the heel region 13 of the article of footwear 10, may be higher or lower than the front of support structure 300, located in the midfoot region 12 of the article of footwear 10. In certain aspects, upper ring 322 and/or lower ring 324 of compression element 320 may provide an angled surface. For example, springs 326 may have a greater height at one side of compression element 320 (e.g., the springs 326 at the back of the compression element 320 located at the heel region 13 of the article of footwear 10 are taller than the springs 326 at the front of the compression element 320 located at the midfoot region 12 of the article of footwear 100). The upper ring 322 and/or lower ring 324 of compression element 320 having springs 326 of various heights may have an angled surface as they follow the changing heights of springs 326. Alternatively, support structure 300 may be angled due to upper plate 346 and/or lower plate 344 having varying thickness. In another aspect, upper member 328 may have a varying thickness.

Referring back to the embodiment illustrated in FIGS. 1A-1B, support structure 300 may be attached to article of footwear 10, such as being attached in the heel region 13 of article of footwear 10. In certain aspects, support structure 300 may be attached to sole structure 200, such as to outsole structure 210 (and/or optionally to other portions of sole structure 200). Support structure 300 may be attached to article of footwear 10 or sole structure 200 in any suitably known fashion.

Sole structure 200 may include an outsole structure 210, a midsole structure 220, and a support structure 300. In certain embodiments, outsole structure 210 extends as a single, continuous layer from the front edge 14 to the back edge 15 of the footwear 10. Thus, the support structure 300 may be positioned on top of the outsole structure 210. Support structure 300 may be attached at its bottom portion (e.g. at lower plate 344) to outsole structure 210 in any known fashion (e.g., by cements or adhesives, by mechanical connectors, and the like). For example, the lower surface of lower plate 344 may be in contact with the upper surface of outsole structure 210, and the lower plate 344 may be secured to the upper surface of outsole structure 210 in any known fashion (e.g., by cements or adhesives, by mechanical connectors, and the like). Alternatively, lower plate 344 of support structure 300 may be formed with outsole structure 210 during the manufacturing process, i.e., lower plate 344 and outsole structure 210 may be formed as a one-piece construction. As non-limiting examples, suitable materials for the lower plate 344 may include plastics (such as PEBAX, TPU), fiber reinforced plastics, and the like. Additionally, the lower surface of the outsole structure 210 may be provided with a suitable ground engaging surface such that the desired traction of the outsole structure 210 (and thereby of the footwear 10) to the ground or other contact surface may be provided.

In certain alternative aspects, a lower support element 312 extends from the heel region 13 to the midfoot region 12 of the article of footwear 10. Lower support element 312 may contact upper 100 in the midfoot region 12 of the article of footwear. In some aspects, a wedge 314 of midsole material may be located to the rear of the intersection of lower support element 312 and upper 100. The wedge 314 of midsole material may assist in moderating impact forces. Further, lower support element 312 extends from the lateral edge to the medial edge of heel region 13. Lower support element 312 may be located between upper surface of outsole structure 210 and lower surface of lower plate 344. In alternative aspects, lower support element 312 may be configured so that support structure 300 may be inserted into lower support element 312 such that lower ring 324 of compression element 320 and/or lower plate 344 fits within lower support element 312. In other aspects, lower support element 312 may replace lower ring 324 of compression element 320. Lower support element 312 may be configured as a generally horizontal plate. In some aspects, lower support element 312 may be substantially planar.

Lower support element 312 may be formed separately from sole structure 200 and subsequently attached to sole structure 200 by any conventionally known fashion. Alternatively, lower support element 312 may be formed integrally with sole structure 200 during the manufacturing process, i.e., lower support element 312 and sole structure 200 are one piece. For example, lower support element 312 may be formed from a dense injection molded foam (e.g., thermoplastic polyurethane foam) and form outsole structure 210. Further, lower support element 312 may be positioned below lower plate 344 of support structure 300. Alternatively, lower support element 312 may be positioned above lower plate 344. In some aspects, lower plate 344 may be formed as part of sole structure 200. Lower support element 312 may be attached to lower plate 344 in any conventionally known fashion (e.g., adhesives or cements, mechanical connectors, and the like). Alternatively, lower support element 312 may be formed with lower plate 344 during the manufacturing process, i.e., may be formed as one piece during construction. Lower support element 312 may also be formed with lower member 330 in a one piece construction.

Referring now to the aspects shown in FIG. 1A, upper 100 extends from the front edge 14 to the back edge 15 of the article of footwear 10. Thus, support structure 300 may be positioned below upper 100. Support structure 300 may be attached at its upper portion (e.g. at upper plate 346) to a lower portion of upper 100 (e.g., to a strobel member) in any known fashion. The upper surface of upper plate 346 may be in contact with the lower surface of upper 100, and it may be secured to the lower surface of upper 100 in any conventionally known fashion. Alternatively, upper plate 346 may be formed with upper 100 during the manufacturing process, i.e., constructed as one piece. As non-limiting examples, suitable materials for the upper plate 346 may include plastics (such as PEBAX, TPU), fiber, reinforced plastics, and the like.

In certain alternative aspects, an upper support element 310 may extend from the heel region 13 to the midfoot region 12. Further, upper support element 310 may extend from the lateral edge to the medial edge of heel region 13. Upper support element 310 may be located between the upper surface of upper plate 346 and the lower surface of upper 100. Upper support element 310 may be attached to upper plate 346 of support structure 300 in any conventionally known fashion (e.g., adhesives or cements, mechanical connectors, and the like). Alternatively, upper support element 310 may be formed with upper plate 346 during the manufacturing process, i.e., these components may be formed as one piece. In alternative aspects, upper support element 310 may be configured so that support structure 300 may be inserted into upper support element 310 such that upper member 328 and/or upper plate 346 fits within upper support element 310. In other aspects, upper support element 310 may replace upper plate 346. Upper support element 310 may be configured as a generally horizontal plate. Upper support element 310 may be substantially planar and/or may substantially follow the contour of the sole of a foot.

Referring back to FIG. 1A, upper support element 310 may optionally have a relatively thickened or built-up compression element beneath a central load-bearing area of the heel of the user. In certain embodiments, a compression element may be formed separately and subsequently integrated with upper support element 310.

Upper support element 310 may be formed separately from upper 100 and subsequently attached to upper 100 in heel region 13 in any conventionally known fashion. Alternatively, upper support element 310 may be formed integrally with upper 100 during the manufacturing process, i.e., may be formed as one piece. In some aspects, upper support element 310 may be injection molded or thermoformed onto upper 100. As one more specific example, if desired, a bottom surface of a strobel or other upper component may be coated or otherwise treated to be hardened to thereby function as the upper support element 310.

Support structure 300 has a multi-regime vertical stiffness characteristic. When a user's foot applies a compressive load having a vertical component to the portion of the footwear 10 in the region of support structure 300, upper ring 322 (and thus, also upper 100, upper support element 310, and upper member 328) exhibits downward movement toward lower ring 324. This initial downward movement of upper ring 322 causes the plurality of springs 326 of compression element 320 to begin to flatten out, and the upper ring 322 is compressed closer to lower ring 324 of compression element 320 by the compressive load. The flattening of springs 326 may cause upper ring 322 to be pulled towards lower ring 324. As upper ring 322 descends toward lower ring 324, upper ring 322 rotates axially relative to lower ring 324. The amount of rotation of upper ring 322 relative to lower ring 324 is at least partially dependent on the degree of flexibility and size of springs 326, as well as on the magnitude or vertical component of the force applied.

In certain aspects, upper member 328, and specifically torsion element 334, is attached to, or includes, upper ring 322. Therefore, as upper ring 322 rotates relative to lower ring 324, the outer ring 336 of torsion element 334 also rotates. Central hub 338 of torsion element 334 may be fixed for movement with the upper 100 (e.g., due to its connection with the upper plate 346), while allowing for outer ring 336 to rotate around central hub 338. Upper plate 346 may also be fixed (e.g., due to a connection to upper support element 310 or upper 100) so that it also does not rotate as a compressive load is applied. As the outer ring 336 of torsion element 334 rotates with respect to central hub 338, spokes 340 may flex. The amount of rotation of outer ring 336 may be least partially dependent on the degree of flexibility and size of spokes 340, as well as on the magnitude or vertical component of the force applied.

In some aspects, when compression is applied to support structure 300, upper ring 322 of compression element 320 rotates causing the outer ring 336 of torsion element 334 to rotate. When the outer ring 336 of the torsion element 334 rotates, spokes 340 flex and torsion element 334 becomes loaded. When the compression is removed, torsion element 334 may release the load, so that the spokes 340 unflex, and the outer ring 336 of the torsion element 334 reverses its rotation. The reverse rotation of the outer ring 336 of the torsion element 334 may assist in reversing the rotation of the upper ring 322 of the compression element 320, allowing support structure 330 to return to its uncompressed shape (or substantially to its uncompressed shape). When the load is relieved or relaxed, the spokes 340 will return to (or substantially return to) their original position and shape by unwinding from their flexed state, which tends to assist in decompressing spring 326, thereby returning springs 326 and upper ring 322 to (or substantially to) their original position.

As disclosed in FIGS. 1A-7, a support structure 300 may include several assembled components, as shown for example by the exploded view of FIG. 2D. The components may be assembled and attached to each other by any suitable means, including bonding adhesives and mechanical fasteners. Alternatively, two or more components, or even an entire support structure, may be formed as a single monolithic piece. Monolithic construction may be achieved by, for example, injection molding, compression molding, blow molding, vacuum molding, additive manufacturing, solid deposition modeling, selective laser sintering, stereolithography, and three-dimensional printing.

Referring to FIGS. 1A-7, embodiments may provide methods of manufacturing a support structure for an article of footwear. In one aspect, a method may include fixing the upper support element 310 to the lower support element 312, disposing the upper member 328 adjacent to the upper support element 310, disposing the lower member 330 adjacent to the lower support element 312, disposing the compression element 320 between the upper member 328 and the lower member 330, fixing the first portion 338 of the torsion element 334 to the upper support element 310, wherein the torsion element 334 has the first portion 338, the second portion 336, and the torsion loading portion 340 in between the first portion 338 and the second portion 336, fixing the second portion 336 of the torsion element 334 to the upper member 328, fixing the lower member 330 to the compression element 320, and fixing the lower member 330 to the lower support element 312. As described above, fixing elements to each other may be accomplished by any suitable means, such as bonding adhesives, mechanical fasteners, and monolithic formation.

In further embodiments, methods may include attaching the support structure to an upper of an article of footwear, such as the upper 100 of article of footwear 10.

Figure 9A:
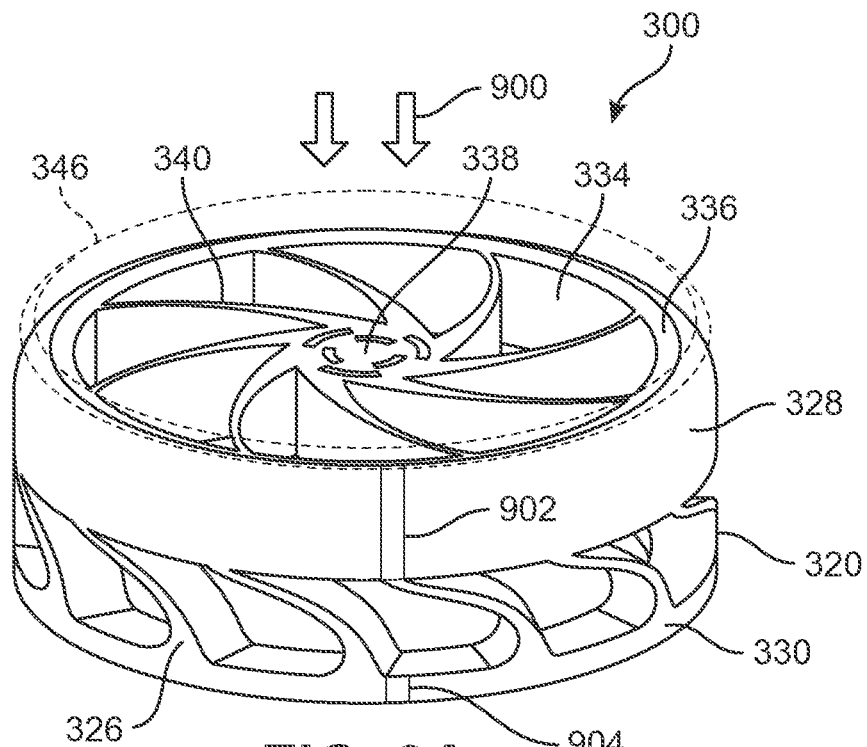
FIG. 9A is a schematic diagram illustrating a perspective view of a support structure of FIG. 2B in accordance with a first configuration before application of a compressive load.

FIGS. 9A-9D illustrate a representative operation of support structure 300 according to an embodiment. FIG. 9A shows support structure 300 in an initial position as a compressive load 900 is about to be applied to the upper plate 346. To allow a view of the initial and subsequent positions of the torsion element 334, upper plate 346 is shown in dashed lines in FIG. 9A and is not shown in FIGS. 9B-9C. In addition, for clarity and illustration purposes, FIGS. 9A-9D show support structure 300 simply with an upper member 328 as in FIG. 2B, and without the separate containment ring 332 shown in FIG. 2A.

As shown in FIG. 9A, before the compressive load 900 is applied, the upper member 328 and the outer ring 336 of the torsion element 334 are in an initial, unloaded, first rotational position as represented by the vertical line 902. In addition, the lower member 330 of the compression element 320 is disposed at a rotational position as represented by the vertical line 904. Vertical line 902 and vertical line 904 are vertically aligned in the initial position of FIG. 9A.

Figure 9B:
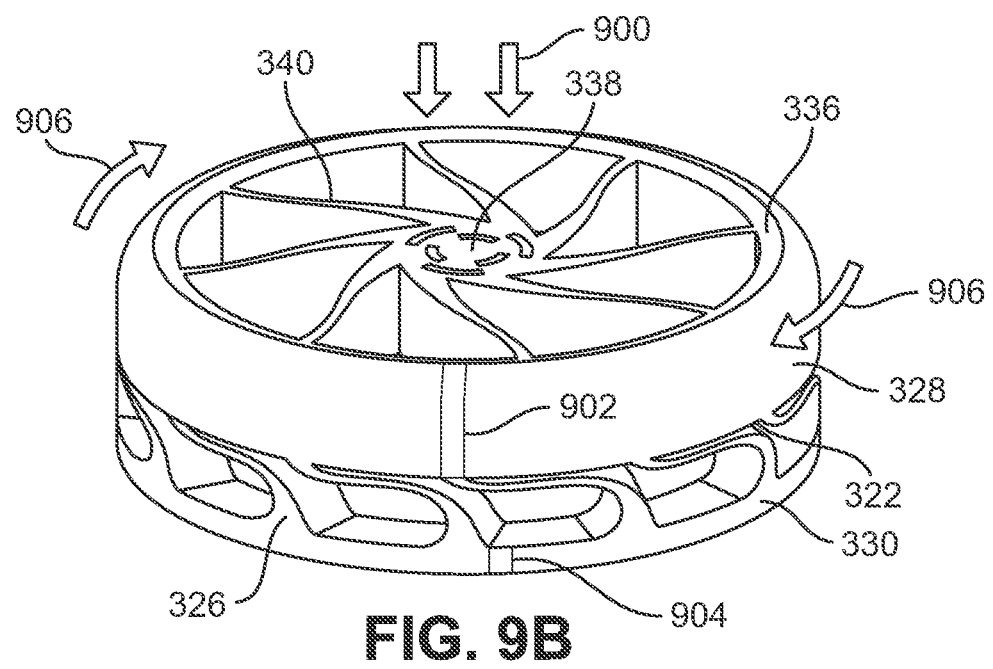
FIG. 9B is a schematic diagram illustrating a perspective view of a support structure of FIG. 2B in accordance with a second configuration after application of a compressive load.

FIG. 9B illustrates support structure 300 after the compressive load 900 having a vertical component is applied to the region of the article of footwear 10 in which support structure 300 is located. As shown, springs 326 of support structure 300 deflect as the compressive load 900 is applied, thereby causing upper member 328 to descend towards lower member 330. As upper member 328 descends, upper ring 322 of compression element 320, which may be attached to or integral with upper member 328, also descends towards lower member 330. Due to the shape and deflection of springs 326, as the upper member 328 descends toward the lower member 330, the upper member 328 and the outer ring 336 of the torsion element 334 (which is attached to the upper member 328) rotate, in this case clockwise as represented by the arrows 906. This rotational displacement to a loaded second rotational position is represented by the displaced rotational position of the vertical line 902, which is rotationally offset in the clockwise direction from the first rotational position of vertical line 902 in FIG. 9A. The rotational position of the lower member 330 in FIG. 9B remains the same as in FIG. 9A since the lower member 330 is rotationally fixed with respect to the article of footwear. As also shown in FIG. 9B, the rotational displacement of the outer ring 336 of the torsion element 334 causes deflection of the spokes 340 since the central hub 338 of the torsion element 334 is rotationally fixed with respect to the article of footwear and to the lower member 330. That deflection of the spokes 340 stores energy in the spokes 340, to be used after the compressive load 340 is released to assist in returning the torsion element 334 and upper member 328 to their initial rotational positions.

Figure 9C:
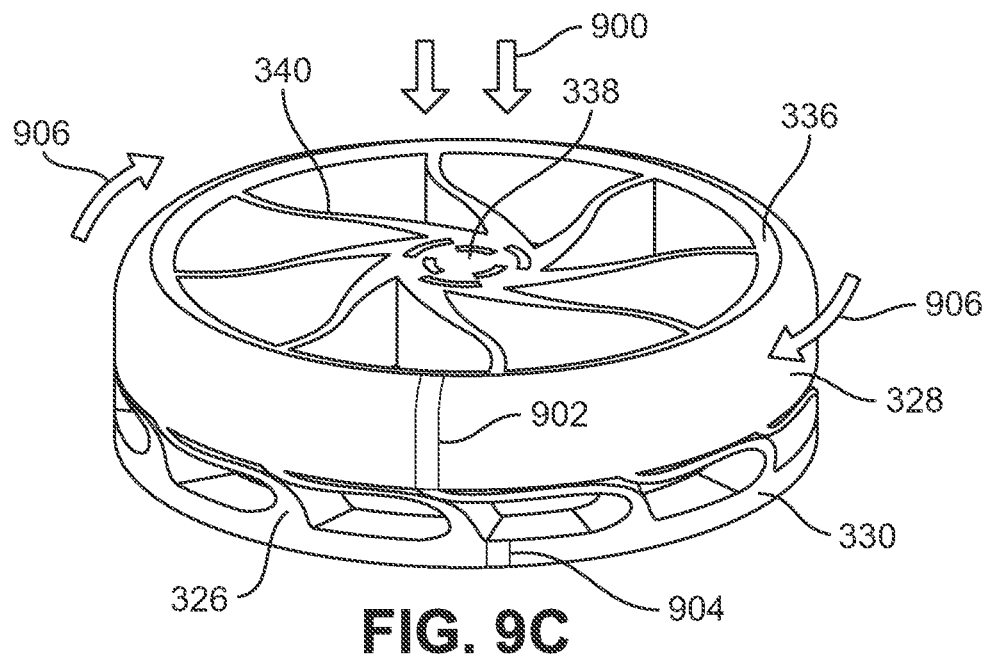
FIG. 9C is a schematic diagram illustrating a perspective view of a support structure of FIG. 2B in accordance with a third configuration after further application of a compressive load in comparison to FIG. 9B.

FIG. 9C illustrates support structure 300 after further application of compressive load 900 in comparison to FIG. 9B. As shown, springs 326 are further compressed such that, in comparison to FIG. 9B, the upper member 328 is closer to the lower member 330, and the upper member 328 and the outer ring 336 are farther rotated in the clockwise direction to a loaded third rotational position as represented by the new position of vertical line 902, which is rotationally offset in the clockwise direction from the second rotational position of FIG. 9B. The rotational position of the lower member 330 remains the same as in FIGS. 9A and 9B as represented by the vertical line 904. As shown in FIG. 9C, the further rotational displacement of the outer ring 336 of the torsion element 334 causes further deflection of the spokes 340, with the central hub 338 of the torsion element 334 remaining rotationally fixed. That further deflection of the spokes 340 stores additional energy in the spokes 340.

Figure 9D:
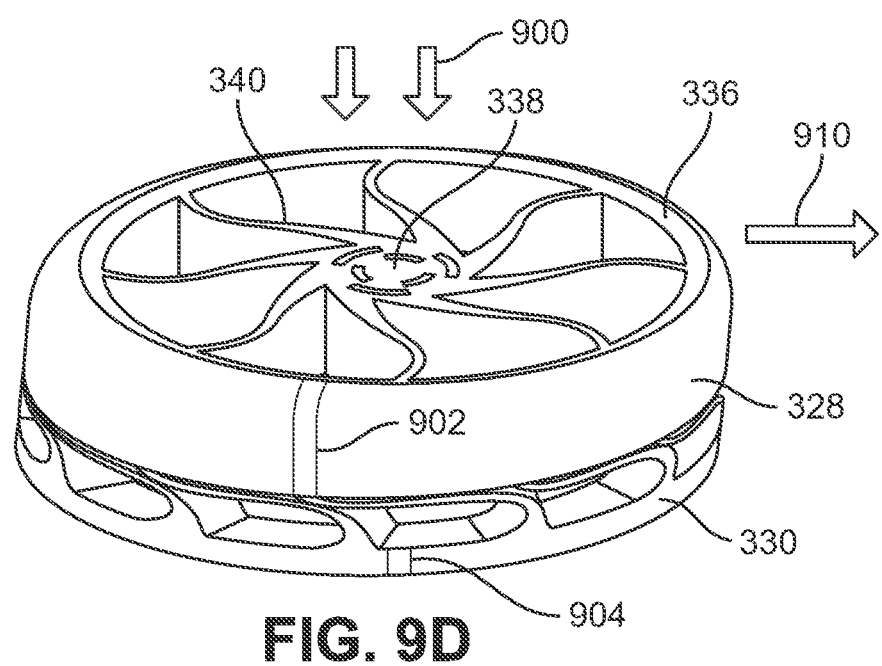
FIG. 9D is a schematic diagram illustrating a perspective view of a support structure of FIG. 2B in accordance with a fourth configuration after further application of a compressive load in comparison to FIG. 9C.

FIG. 9D illustrates support structure 300 after further application of compressive load 900 in comparison to FIG. 9C, with the support structure 300 fully compressed. As shown, springs 326 are further compressed such that, in comparison to FIG. 9C, the upper member 328 is closer to the lower member 330, and the upper member 328 and the outer ring 336 are farther rotated in the clockwise direction to a loaded fourth rotational position as represented by the new position of vertical line 902, which is rotationally offset in the clockwise direction from the third rotational position of FIG. 9C. The rotational position of the lower member 330 remains the same as in FIGS. 9A-9C as represented by the vertical line 904. As shown in FIG. 9D, the further rotational displacement of the outer ring 336 of the torsion element 334 causes further deflection of the spokes 340, with the central hub 338 of the torsion element 334 remaining rotationally fixed. That further deflection of the spokes 340 stores additional energy in the spokes 340. In this fully compressed configuration, the torsion element 334 may contact a compression base (not shown) such as compression base 342 of FIG. 2B, to avoid further compression of the support structure 300 and rotation of the upper member 328 and outer ring 336 of the torsion element 334.

As shown in FIG. 9D, in response to the compressive load 900, a support structure 300 may also deflect in a lateral direction as represented by the arrow 910. The rotation of the upper member 328 may move the upper member 328 laterally relative to the fixed lower member 330. The support structure 300 may also deflect in the lateral direction if the compressive load 900 includes a lateral force, such as when a user applies a sideways force as part of a step to the side, sometimes referred to as a cutting action. As shown in FIG. 9D, support structure 300 may provide transverse support for such a laterally applied force. Upper member 328 may shift in response to such a transverse motion, thereby providing support to a user.

Figure 10A:
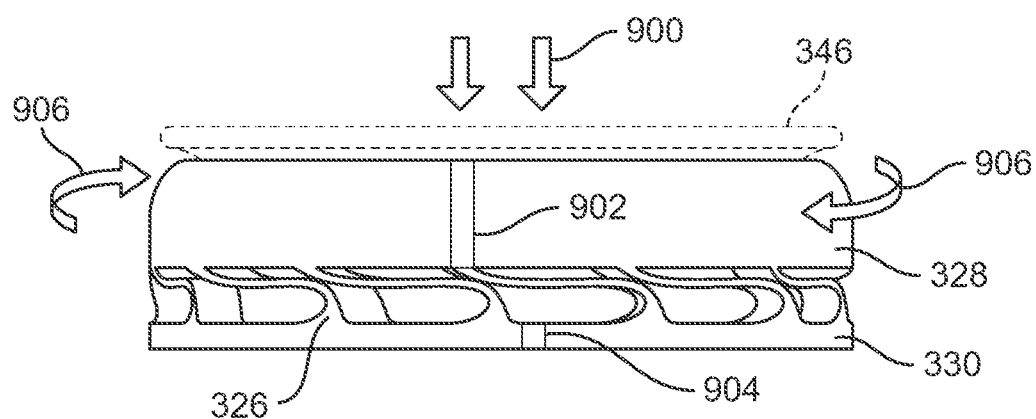
FIG. 10A is a schematic diagram illustrating a side view of the support structure of FIG. 9C in accordance with the third configuration.
Figure 10B:
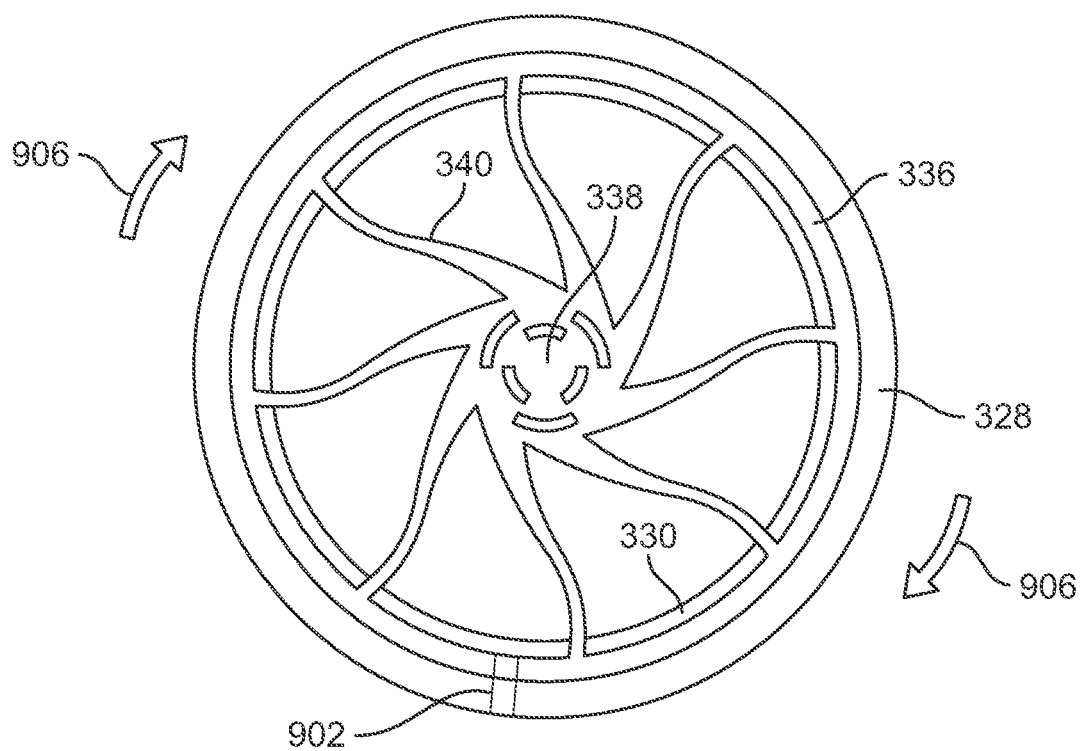
FIG. 10B is a schematic diagram illustrating a top view of the support structure of FIG. 9C in accordance with the third configuration.
Figure 10C:
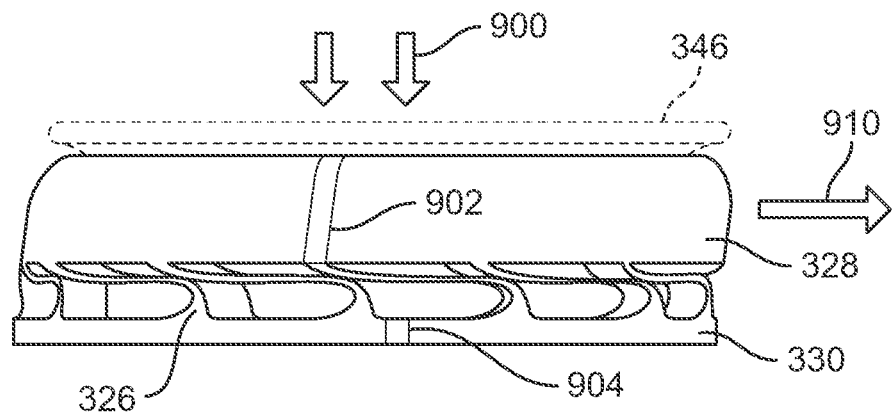
FIG. 10C is a schematic diagram illustrating a side view of the support structure of FIG. 9D in accordance with the fourth configuration.
Figure 10D:
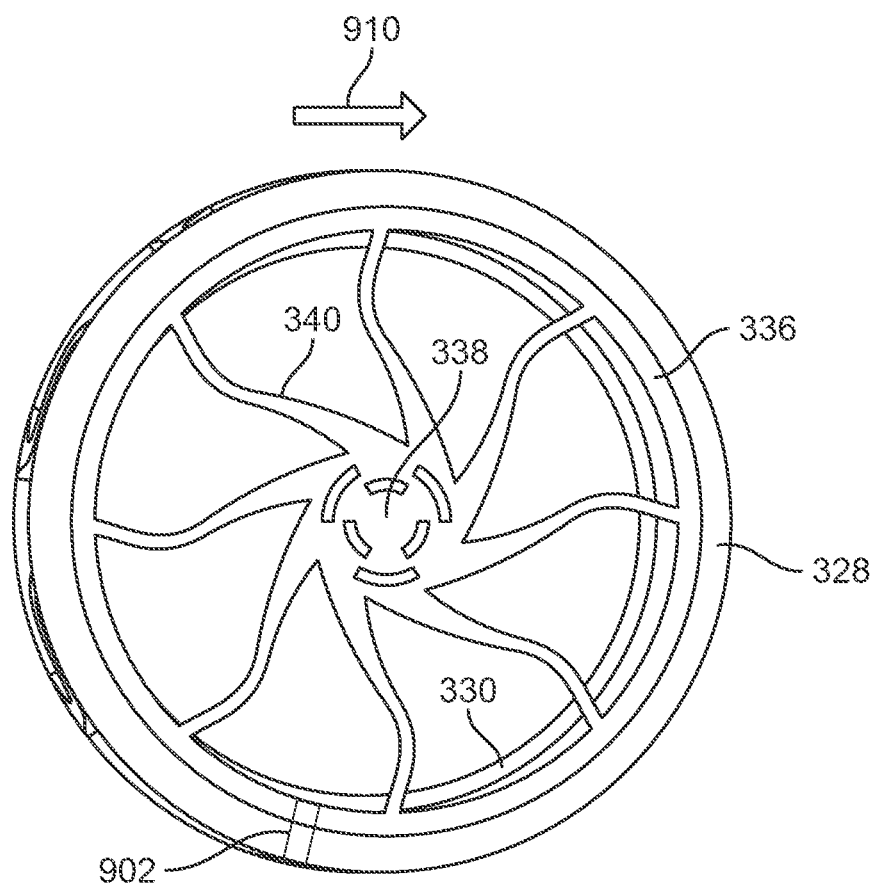
FIG. 10D is a schematic diagram illustrating a top view of the support structure of FIG. 9D in accordance with the fourth configuration.

FIGS. 10A and 10B illustrate a side view and a top view, respectively, of the support structure 300 corresponding to the compression and rotational condition shown in FIG. 9C. Likewise, FIGS. 10C and 10D illustrate a side view and a top view, respectively, of the support structure corresponding to the compression and rotational condition shown in FIG. 9D. Comparing FIG. 10C to FIG. 10A and FIG. 10B to FIG. 10D shows how support structure 300 may deflect in a lateral direction as represented by arrow 910. In addition, comparing FIG. 10B to FIG. 10D shows how the spokes 340 of torsion element 334 may deflect or stretch as the outer ring 336 rotates with respect to the fixed central hub 338, and how the spokes 340 may further deflect (e.g., by twisting or rolling) in response to the lateral deflection of the upper member 328 with respect to the lower member 330. FIG. 10D illustrates a top view of the support structure 300 in a compressed state and subject to a shear force.

According to certain aspects, relatively stiff springs 326 could be provided by increasing the thickness of the springs, increasing the stiffness of the material used to form the springs, and/or decreasing the active length of the springs (i.e., the length of the springs 326 extending from lower ring 324 to upper ring 322). Conversely, relatively flexible springs 326 could be provided by decreasing the thickness of the springs, decreasing the stiffness of the material used to form the springs, and/or increasing the active length of the springs. In certain aspects, the stiffness of support structure 300 may be modified by increasing or decreasing the number of springs 326 present in support structure 300.

Similarly, according to certain aspects, relatively stiff spokes 340 could be provided by increasing the thickness of the spokes, increasing the stiffness of the material used to form the spokes, and/or decreasing the active length of the spokes (i.e., the length of the spokes 340 extending from central hub 338 to outer ring 336). Conversely, relatively flexible spokes 340 could be provided by decreasing the thickness of the spokes, decreasing the stiffness of the material used to form the spokes, and/or increasing the active length of the spokes. In certain aspects, the stiffness of support structure 300 may be modified by increasing or decreasing the number of spokes 340 present in support structure 300.

In addition, referring to FIGS. 2C, 2D, 4A, 9A-9D, 10B, and 10D, although the spokes 340 of torsion element 334 may be shown curving from the central hub 338 to the outer ring 336 in a counter-clockwise direction opposite to the clockwise direction in which the springs 326 of the compression element 320 are curving, the spokes 340 alternatively may curve in the clockwise direction so that the spokes 340 are further curved and stretched when the upper member 328 and the outer ring 336 of the torsion element rotate in the clockwise direction 906. In other words, referring for example to FIG. 2D, the torsion element 334 may be flipped over to change the curved orientation of the spokes 340 from counter-clockwise to clockwise. With the spokes 340 curved in the clockwise direction, after release of a vertical compression load, the further curved and stretched spokes 340 may pull the outer ring 336 back in the counter-clockwise direction to assist in returning the torsion element 334 and compression element 320 to their original unloaded positions.

Support structure 300 has not only a vertical stiffness characteristic, but also a transverse stiffness characteristic. When a user's foot applies a transverse load to the portion of the footwear 10 in the region of upper plate 346 (i.e., a heel cup) (such as when a cutting action takes place), sideways or lateral movement of upper plate 346 (and thus, also of upper 100) causes upper plate 346 to adjust slightly such as by tilting from one side to the opposite side. In some instances, the edges of upper plate 346 configured as a heel cup will tip in response to the transverse movement. This initial transverse movement of upper member 328 is generally accompanied by a vertical compressive load and the corresponding relative displacements discussed above with respect to compression element 320.

Compression element 320, and additional elements of support structure 300, may be formed of a relatively lightweight, relatively stiff or rigid material. For example, compression element 320 may be formed of plastics, such as PEBAX® (a poly-ether-block co-polyamide polymer available from Atofina Corporation of Puteaux, France), silicone, thermoplastic polyurethane (TPU), polypropylene, polyethylene, ethylvinylacetate, styrene ethylbutylene styrene, and the like. Optionally, the material of compression element 320 and/or other components of support structure 300 may also include fillers or other components to tailor its hardness, wear, durability, abrasion-resistance, compressibility, stiffness, and/or strength properties. Thus, for example, compression element 320 and/or other components of support structure 300 may include reinforcing fibers, such as carbon fibers, glass fibers, graphite fibers, aramid fibers, basalt fibers, and the like. Even further, compression element 320 may include one or more metal elements or subcomponents.

Such metal elements or subcomponents may be particularly suitable in high stress, high strain areas of the compression element 320.

Further, compression element 320 and/or the additional elements of support structure 300 may be formed of multiple materials. Optionally, compression element 320 and/or the additional elements of support structure 300 may be formed of a single material, a single part, or multiple parts. In general, support structure 300 may be formed of any number of materials.

Similar to compression element 320, upper support element 310 and lower support element 312 may be formed of a relatively lightweight, relatively stiff material. For example, upper support element 310 and lower support element 312 may be formed of conventional midsole and/or outsole materials, such as natural or synthetic rubber or a combination thereof, polyurethane foams, ethylvinylacetate foams, and the like. The material may be solid, foamed, filled, and the like or a combination thereof. One particular rubber for use in upper support element 310 and/or lower support element 312 may be an OGRS rubber. Another particular composite rubber mixture may include approximately 75% natural rubber and 25% synthetic rubber. The synthetic rubber could include a styrene-butadiene rubber. By way of non-limiting examples, other suitable polymeric materials for upper support element 310 and lower support element 312 include plastics, such as PEBAX® (a polyether-block co-polyamide polymer available from Atofina Corporation of Puteaux, France), silicone, thermoplastic polyurethane (TPU), polyurethane, polypropylene, polyethylene, ethylvinylacetate, styrene ethylbutylene styrene, and the like. Optionally, the material of upper support element 310 and lower support element 312 may also include fillers or other components to tailor its hardness, wear, durability, coefficient of friction, abrasion-resistance, compressibility, stiffness, and/or strength properties. Thus, for example, upper support element 310 and lower support element 312 may include reinforcing fibers, such as carbon fibers, glass fibers, graphite fibers, aramid fibers, basalt fibers, and the like. These support elements 310 and/or 312 also may be made from metals or metal alloys.

According to even other aspects of this disclosure and as shown in FIG. 11, a support structure 300 may be provided in the forefoot region 11 of the article of footwear 10. In such an embodiment, it is expected that the overall height of the support structure 300 provided in the forefoot region 11 would typically be less than that of a support structure 300 provided in the heel region 13. By way of non-limiting examples, the height of the support structure 300 (as measured from the lower supporting element 312 to the upper support element 310) provided in the heel region 13 may range from approximately 10.0 mm to approximately 30.0 mm, from approximately 15.0 mm to approximately 30.0 mm, or from approximately 20.0 mm to approximately 30.0 mm. For comparison purposes, the vertical height of the support structure provided in the forefoot region 13 may range from approximately 5.0 mm to approximately 15.0 mm, from approximately 8.0 mm to approximately 15.0 mm, or from approximately 10.0 mm to approximately 15.0 mm.

As disclosed herein, embodiments of support structures may include provisions for decoupling (or partially decoupling) the vertical stiffness characteristics of a support structure from the transverse (or shear) stiffness characteristics of the support structure. In other words, the vertical stiffness characteristics of a support structure may be set independently of, or substantially independently of, the transverse stiffness characteristics of the support structure. A designer may therefore modify aspects of the support structure to achieve a desired vertical stiffness of a support structure, while not affecting, or minimally affecting, the transverse stiffness of the support structure. Likewise, a designer may modify aspects of the support structure to achieve a desired transverse stiffness of a support structure, while not affecting, or minimally affecting, the vertical stiffness of the support structure.

In an embodiment, decoupling of vertical and transverse stiffness characteristics may be achieved by modifying aspects of a compression element of a support structure, such as compression element 320 of support structure 300. For example, referring to FIGS. 2A-2D, the shape, size, or position of springs 326 may be modified to change either or both of the vertical stiffness and transverse stiffness provided by the springs 326. In an embodiment, referring to FIG. 12, vertical stiffness may be tailored by changing the dimension 1202 of a spring 326 in the circumferential direction, while transverse stiffness may be separately tailored by changing the dimension 1204 in the radial direction. In other words, the vertical and transverse stiffness characteristics of a support structure may be separately tuned by independently varying the circumferential dimension 1202 and independently varying the radial dimension 1204. Thus, for example, springs 326 having a relatively large radial dimension 1204 (e.g., extending radially deep into the support structure) and a relatively small circumferential dimension 1202 (e.g., extending a short distance along the outer circumference of the support structure) may be relatively soft in response to a vertical compression of the support structure, but relatively firm in response to a transverse shear force applied to the support structure. On the other hand, as another example, springs 326 having a relatively small radial dimension 1204 and a relatively large circumferential dimension 1202 may be relatively firm in response to a vertical compression of the support structure, but relatively soft in response to a transverse shear force applied to the support structure. In an embodiment, each spring 326 may have a radial dimension 1204 that is greater than its circumferential dimension 1202. In another embodiment, the plurality of springs 326 may vary in both radial dimension and circumferential dimension.

Figure 13A:
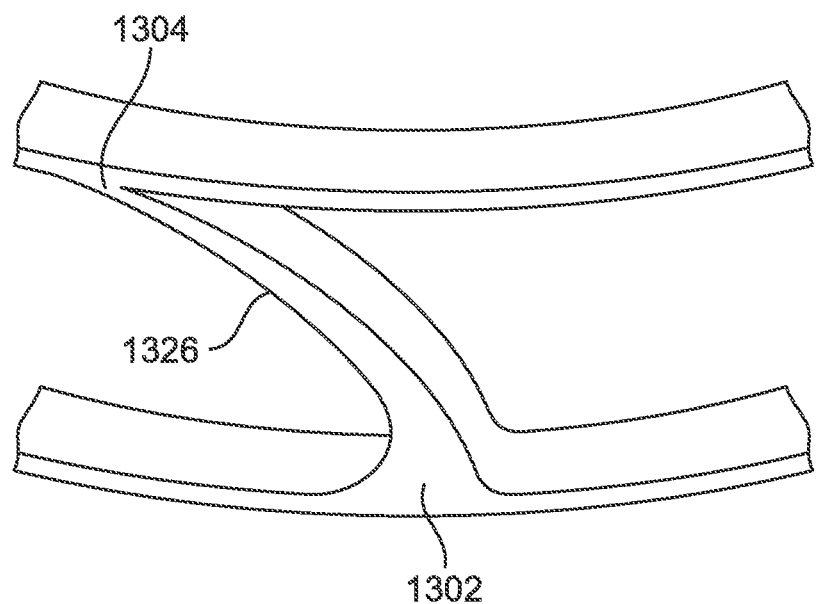
FIGS. 13A and 13B are schematic diagrams illustrating exemplary configurations of springs of a compression element in accordance with aspects of this disclosure.
Figure 13B:
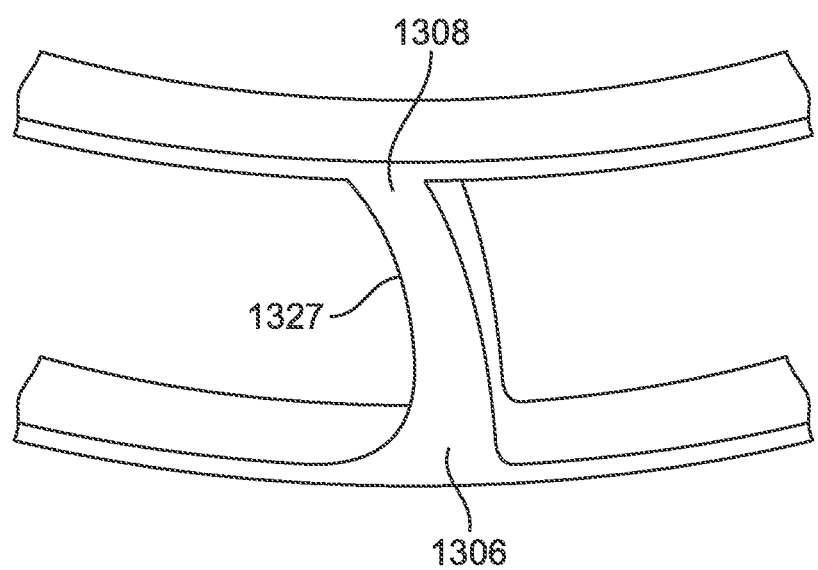

Vertical and transverse stiffness may also be tailored by altering the shape that springs assume in vertically extending along a support structure. For example, as shown in FIG. 13A, the more a spring 1326 extends circumferentially away from its lowest point 1302 to its highest point 1304 (e.g., the degree it "leans over"), the less firm the spring 1326 may be in response to a vertical compression of the support structure. Conversely, in another example as shown in FIG. 13B, a spring 1327 shaped with a highest point 1308 only slightly circumferentially offset from its lowest point 1306 may be more firm in response to a vertical compression of the support structure.

Accordingly, embodiments may provide vertical and transverse stiffness characteristics suitable for desired performance of an article of footwear, e.g., based on the activity for which the article of footwear is intended. For example, articles of footwear intended for running may therefore provide firm vertical stiffness and less firm transverse stiffness. As another example, articles of footwear intended for activities requiring sharp side-to-side movements such as cross-training, tennis, or basketball, may therefore provide both firm vertical stiffness and firm transverse stiffness. Designers may therefore modify the compression loading element (e.g., springs) to independently adjust the vertical and transverse stiffness characteristics of an article of footwear to achieve a desired performance.

Thus, from the above disclosure it can be seen that the decoupled (or partially decoupled) vertical and transverse stiffness characteristics of sole structure 200 may provide better vertical impact protection, while still achieving the desired degree of transverse stability (or, alternatively, flexibility) for a wearer of the article of footwear. It is generally understood that the decoupling of vertical and transverse stiffness characteristics of sole structure 200 occurs due to the increase or decrease in the depth of springs 326 towards the center of the support structure 300, thereby increasing or decreasing the transverse stability of sole structure 200. In order to offset the potential change in vertical reaction force due to the increase or decrease in the depth of springs 326, the thickness of springs 326 or spokes 340 could be adjusted.

The performance characteristics of the support structure are primarily dependent upon factors that include the dimensional configurations of compression element 320 and the properties of the material selected for the compression element. By designing compression element 320 to have specific dimensions and material properties, cushioning and stability of the footwear may be generally tuned to meet the specific demands of the activity for which the footwear is intended to be used. For walking shoes, for example, the dimensional and material properties of compression element 320 may be selected to provide a medium degree of vertical impact force attenuation with a high degree of transverse stability. For running shoes, the impact-attenuating properties of the compression element 320 may be enhanced, while still maintaining a relatively high degree of lateral stability. As another example, the dimensional and material configuration of the springs 326 of the compression element 320 may also be selected to provide an even greater degree of lateral stability in basketball shoes.

In general, the dimensional and material properties of compression element 320 specifically, and support structure 300 generally, will be selected to accommodate expected vertical impact loads and to provide a generally preferred degree of impact-attenuation for a particular activity, while the dimensional and material properties of springs 326 of compression element 320 will be selected to provide the preferred degree of transverse stability and/or transverse motion control. Thus, the disclosed support structure allows the sole structure 200 to be tailored to the specific application.

Although embodiments disclosed herein may show support structures having substantially symmetric configurations (e.g., a circular support structure positioned with its center along the longitudinal axis of the article of footwear), other embodiments may provide asymmetric configurations (e.g., oval-shaped or kidney bean-shaped positioned off-center of a longitudinal axis). Such asymmetric configurations may be useful for accommodating asymmetrically-shaped portions of an article of footwear or for obtaining desired performance characteristics that benefit from asymmetric rotation or asymmetric load bearing of a support structure. For example, as shown in FIG. 14, an oval shaped support structure 1402 may be positioned in an arch region of an article of footwear 1400 to accommodate asymmetrical loads applied by a foot in that arch region (e.g., rolling of the foot in the arch region). As another example, an oval shaped support structure 1404 may be positioned in the distal end of the heel region of an article of footwear 1400 to accommodate that asymmetrically-shaped portion of the article of footwear 1400. As another example, an oval shaped support structure 1406 may be positioned in the forefoot region of an article of footwear 1400 to accommodate asymmetric forces applied by a big toe of a foot.

Figure 14A:
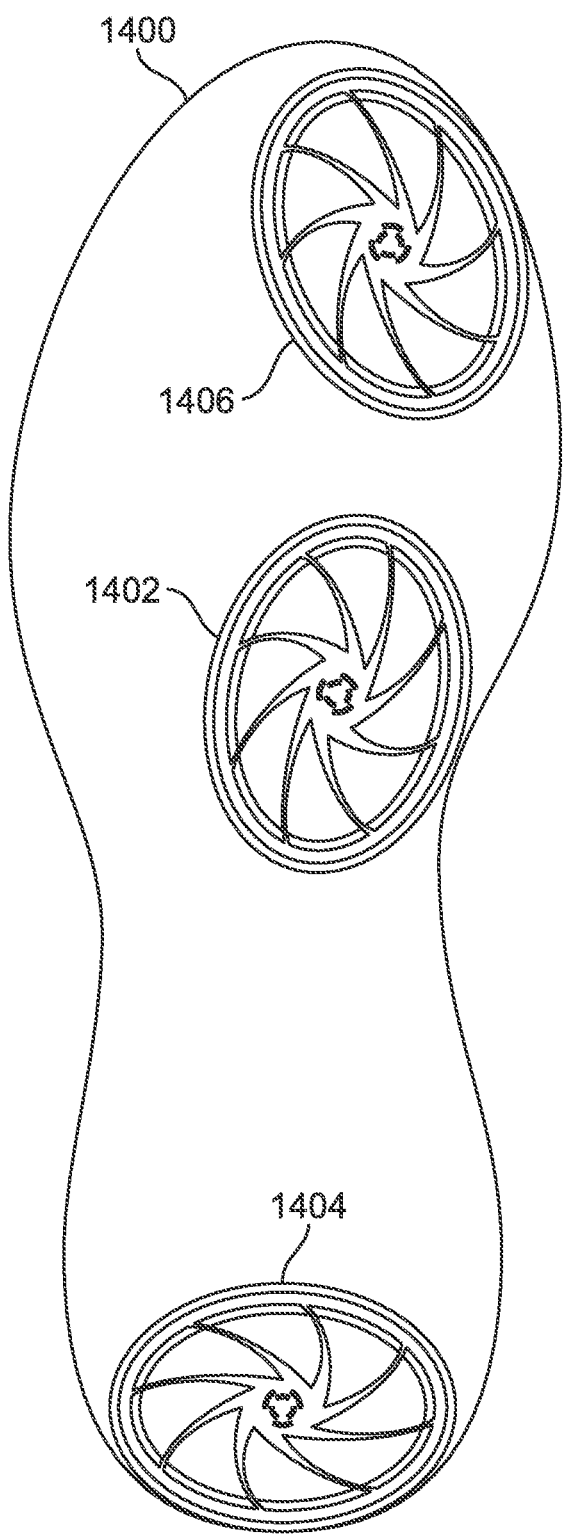
FIG. 14A is a schematic diagram illustrating alternatively shaped and positioned support structures in accordance with aspects of this disclosure.
Figure 14B:
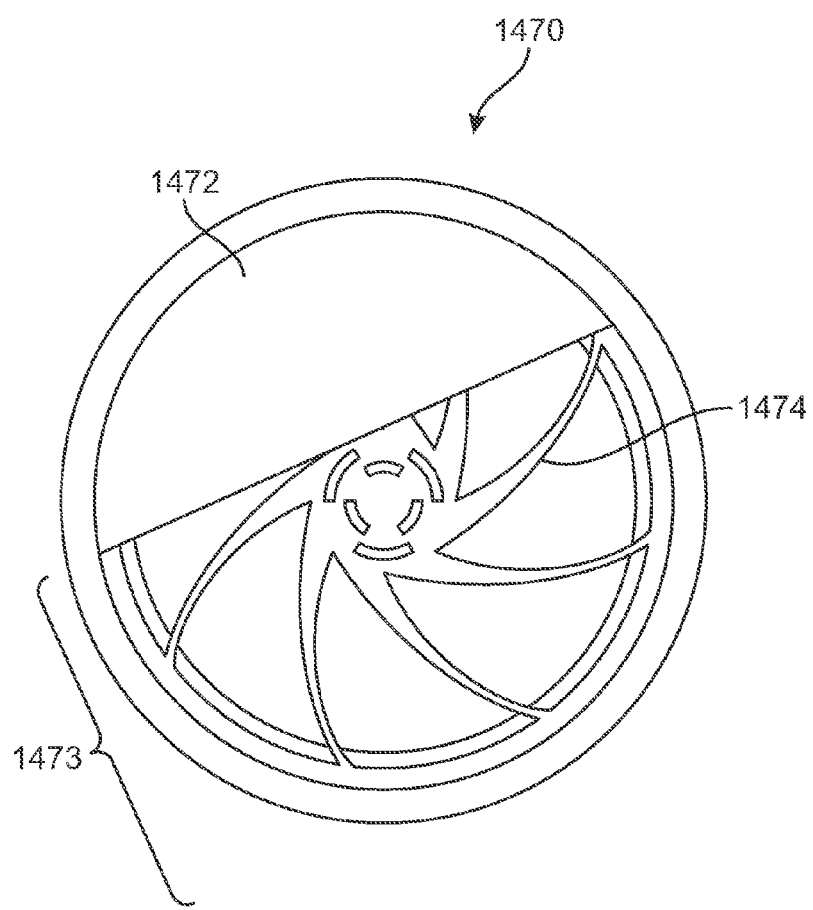
FIG. 14B is a schematic diagram illustrating an exemplary support structure in which the compression element and torsion element are limited to a portion of the support structure, in accordance with aspects of this disclosure.

In addition to varying the shape of a support structure, alternative embodiments may limit the compression element and torsion element to a portion of an enclosed support structure to, for example, provide vertical and transverse stiffness characteristics at desired locations of the support structure. Thus, instead of having the compression loading elements and torsion element extend all the way around the support structure, the compression loading elements and torsion element may be limited to only a portion of the support structure, such as a one-half or two-thirds of the support structure. As an example, FIG. 14B shows an embodiment of a support structure 1470 in which a portion 1472 is devoid of the compression loading elements and torsion element. Portion 1472 may, for example, be made solid, foamed, filled, and the like, or a combination thereof. Portion 1472 may be, for example, a resilient, polymer foam material, such as polyurethane or ethylvinylacetate. Torsion element 1474 and compression loading elements (not shown from this view) may be disposed in the remaining portion 1473 of the support structure. According to these embodiments, support structures may be strategically placed within an article of footwear to provide desired vertical and transverse stiffness characteristics at particular locations or regions.

Figure 14C:
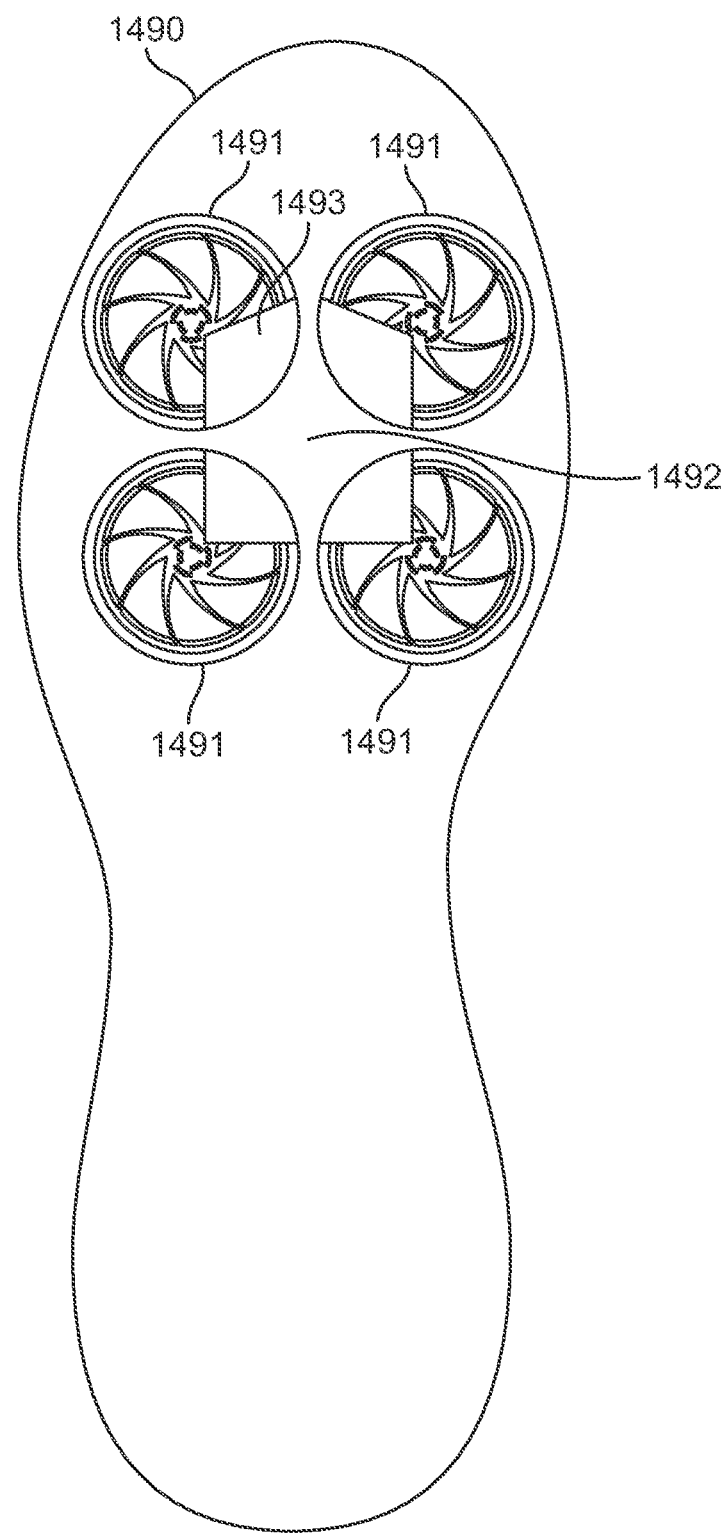
FIG. 14C is a schematic diagram illustrating a plurality of support structures disposed in a forefoot region of an article of footwear, with each of the support structures having a compression element and torsion element limited to a portion of the support structure, in accordance with aspects of this disclosure.

As an example, FIG. 14C shows a forefoot region of an article of footwear 1490 having a plurality of support structures 1491 that provide outer peripheral portions of the forefoot region with vertical and transverse stiffness characteristics associated with the compression elements and torsion elements, while providing a central portion 1492 of the forefoot region with performance characteristics associated with the remaining portions 1493 of the support structures. Those remaining portions may, for example, be solid, foamed, filled, and the like, or a combination thereof. The remaining portions may be, for example, a resilient, polymer foam material, such as polyurethane or ethylvinylacetate.

Figure 14D:
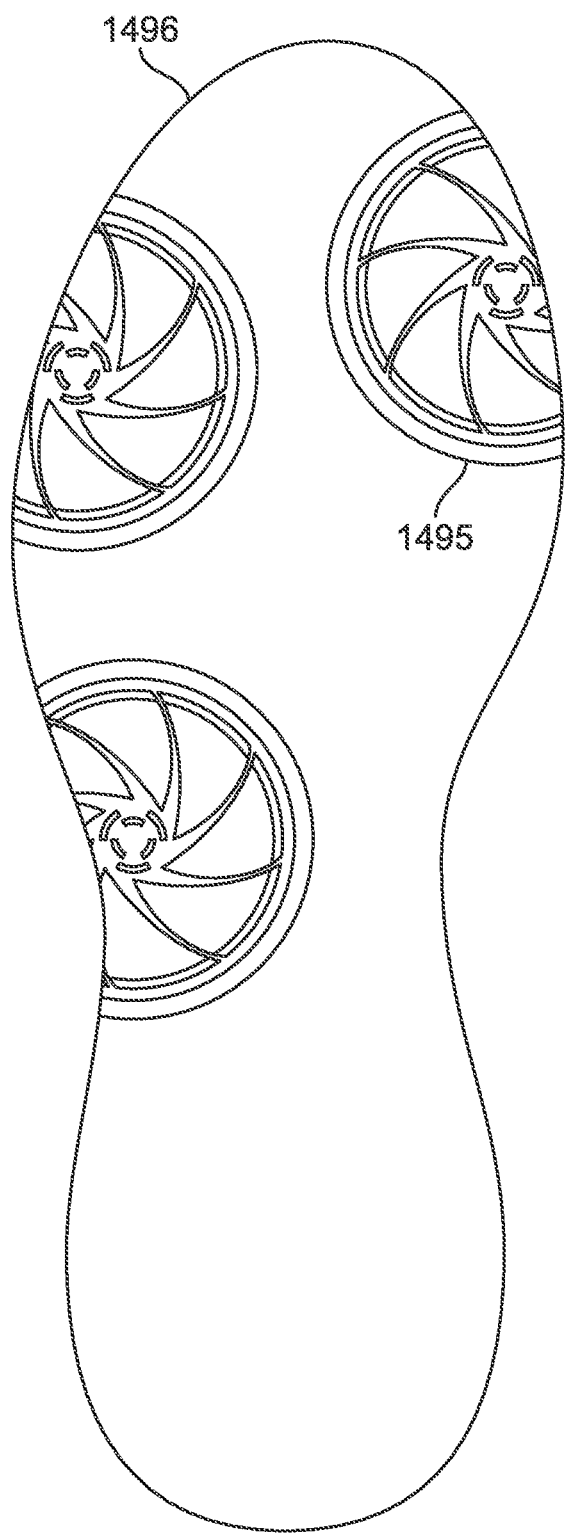
FIG. 14D is a schematic diagram illustrating support structures omitting portions other than a compression element and torsion element, in accordance with aspects of this disclosure.

In alternative embodiments, the remaining portions of the support structures may be omitted, for example, if the support structures are positioned at an outer peripheral edge of an article of footwear. As an example, FIG. 14D illustrates three support structures 1495 disposed at edges of an article of footwear 1496. The compression elements and torsion elements of the support structures 1495 may extend along the interior portions of the support structures 1495, as shown, and not along the outer peripheral edges of the article of footwear. This configuration may provide desired vertical and transverse stiffness characteristics at the interior of the article of footwear.

Figure 15:
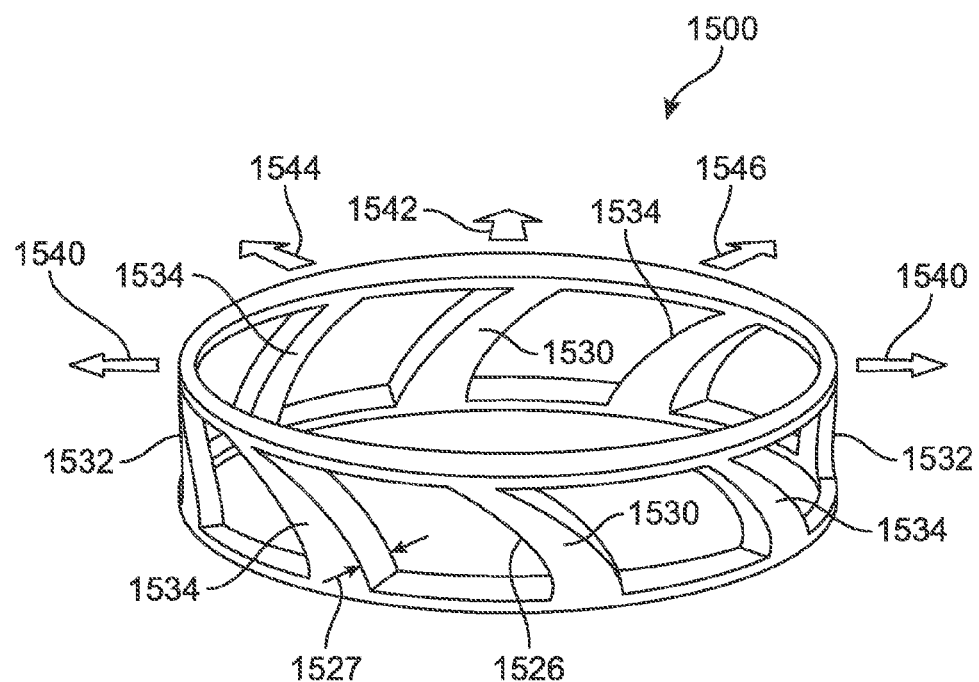
FIG. 15 is a schematic diagram illustrating an exemplary support structure having compression loading elements varying in radial dimension in accordance with aspects of this disclosure.

Embodiments may also provide asymmetric performance characteristics by varying the compression loading elements within a support structure. Thus, although embodiments disclosed herein may show substantially uniform compression loading elements, such as springs 326 in FIG. 3, other embodiments may vary the size, shape, or configuration of the compression loading elements. For example, as shown in FIG. 15, springs 1526 of a compression element 1500 may vary in their radial dimensions 1527 to provide different transverse stiffness characteristics in different directions across the compression element 1500. As shown, springs 1530 may have the largest radial dimension, springs 1532 may have the smallest radial dimension, and springs 1534 may have a radial dimension in between those of springs 1530 and 1532. Those differences in radial dimension may provide differences in transverse stiffness. As shown, the thicker springs 1530 may provide a transverse stiffness in the direction 1542 that is greater than the transverse stiffness in the direction 1540 provided by the thinner springs 1532. Springs 1534 may provide a transverse stiffness in the directions 1544 and 1546 that is less than the transverse stiffness in the direction 1542 provided by the springs 1530 and is greater than the transverse stiffness in the direction 1540 provided by the springs 1532. Those differences in transverse stiffness may be useful in positioning a support structure in an article of footwear for which different transverse stiffness characteristics are desired, e.g., more if more transverse stiffness is desired in a direction from a medial side to a transverse side than in a direction from the toe to the heel.

Figure 16:
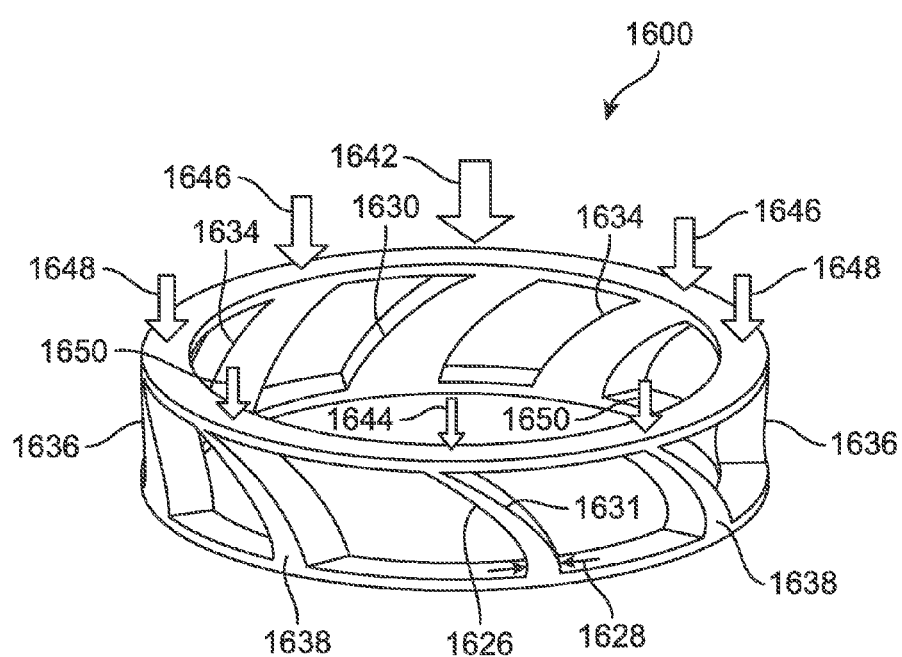
FIG. 16 is a schematic diagram illustrating an exemplary support structure having compression loading elements varying in circumferential dimension in accordance with aspects of this disclosure.

As another example, as shown in FIG. 16, springs 1626 of a compression element 1600 may vary in their circumferential dimensions 1628 to provide different vertical stiffness characteristics in different locations of the compression element 1600. As shown, spring 1630 may have the largest circumferential dimension, spring 1631 may have the smallest circumferential dimension, and the remaining springs may incrementally decrease in circumferential dimension in a direction from the widest spring 1630 to the narrowest spring 1631. In an embodiment, springs 1634 may have substantially the same circumferential dimension, springs 1636 may have substantially the same circumferential dimension, and springs 1638 may have substantially the same circumferential dimension.

The differences in circumferential dimension may provide differences in vertical stiffness. As shown in FIG. 16, the widest spring 1630 may provide a largest vertical stiffness at location 1642 and the narrowest spring 1631 may provide a smallest vertical stiffness at location 1644. Springs 1634 may provide a vertical stiffness at locations 1646 that is less than the vertical stiffness at location 1642 provided by widest spring 1630. Springs 1636 may provide a vertical stiffness at locations 1648 that is less than the vertical stiffness at locations 1646 provided by springs 1634. Springs 1638 may provide a vertical stiffness at locations 1650 that is less than the vertical stiffness at locations 1648 provided by springs 1636 and is greater than the smallest vertical stiffness at location 1644 provided by the narrowest spring 1631. Those differences in vertical stiffness may be useful in positioning a support structure in an article of footwear for which different vertical stiffness characteristics are desired at different locations of the article of footwear. For example, location 1642 of compression element 1600 may be disposed at a lateral side of an article of footwear so that the compression element 1600 provides more vertical stiffness at the lateral side of the article of footwear than at the medial side of the article of footwear where the narrowest spring 1631 would be disposed. Providing more vertical stiffness at the lateral side may improve lateral support for activities requiring side-to-side movement such as cross-training, tennis, or basketball.

The following Clauses provide exemplary configurations for the support structure 300 for the article of footwear 10 described above.

Clause 1: A support structure for an article of footwear having an upper and an outsole may include a torsion element having a central hub fixed for movement with the upper and an outer ring attached to the central hub, the outer ring being selectively rotatable relative to the central hub. The support structure may additionally include a compression element having a first ring fixed for movement with the outer ring, a second ring fixed for movement with the outsole, and a plurality of springs extending between and joining the first ring and the second ring, the plurality of springs permitting selective relative movement between the first ring and the second ring.

Clause 2: The support structure of Clause 1, wherein the outer ring is attached to the central hub via a plurality of spokes radiating from the central hub.

Clause 3: The support structure of Clause 2, wherein the plurality of spokes include a first cross-sectional area proximate to a junction of each spoke and the central hub and a second cross-sectional area smaller than the first cross-sectional area proximate to a junction of each spoke and the outer ring.

Clause 4: The support structure of Clause 2, wherein the plurality of spokes include a decreasing cross-sectional area in a direction extending from the central hub to the outer ring.

Clause 5: The support structure of Clause 1, wherein the plurality of springs are equally circumferentially spaced around the first ring and the second ring.

Clause 6: The support structure of Clause 1, wherein the plurality of springs are angularly spaced around the first ring and the second ring.

Clause 7: The support structure of Clause 1, wherein each of the plurality of springs is attached to the first ring at a first attachment location and is attached to the second ring at a second attachment location that is offset from the first attachment location.

Clause 8: The support structure of Clause 1, wherein the plurality of springs include a first cross-sectional area proximate to a junction of each spring and the first ring and a second cross-sectional area larger than the first cross-sectional area proximate to a junction of each spring and the second ring.

Clause 9: The support structure of Clause 1, wherein the plurality of springs include a decreasing cross-sectional area in a direction extending from the second ring to the first ring.

Clause 10: The support structure of Clause 1, further comprising a compression base having an engagement surface that extends into the compression element.

Clause 11: The support structure of Clause 10, wherein the compression base is one of a foam pad and a fluid-filled bladder.

Clause 12: The support structure of Clause 10, wherein the engagement surface opposes the torsion element and is operable to engage the torsion element when the torsion element is moved toward the second ring of the compression element a predetermined distance.

Clause 13: A support structure for an article of footwear having an upper and an outsole may include a torsion element having a central hub fixed for movement with the upper and an outer ring attached to the central hub via a plurality of spokes radiating from the central hub, the plurality of spokes permitting selective rotation of the outer ring relative to the central hub. The support structure may additionally include a compression element including a first ring fixed for movement with the outer ring, a second ring fixed for movement with the outsole, and a compression loading element operable to absorb forces associated with movement of the first ring toward the second ring, the first ring being selectively movable relative to the first ring when the torsion element is moved in a direction toward the second ring.

Clause 14: The support structure of Clause 13, wherein the plurality of spokes include a first cross-sectional area proximate to a junction of each spoke and the central hub and a second cross-sectional area smaller than the first cross-sectional area proximate to a junction of each spoke and the outer ring.

Clause 15: The support structure of Clause 14, wherein the plurality of spokes include a decreasing cross-sectional area in a direction extending from the central hub to the outer ring.

Clause 16: The support structure of Clause 13, wherein the compression loading element includes a plurality of springs extending between and joining the first ring and the second ring, the plurality of springs permitting selective relative movement between the first ring and the second ring.

Clause 17: The support structure of Clause 16, wherein the plurality of springs are equally circumferentially spaced around the first ring and the second ring.

Clause 18: The support structure of Clause 16, wherein the plurality of springs are angularly spaced around the first ring and the second ring.

Clause 19: The support structure of Clause 16, wherein each of the plurality of springs is attached to the first ring at a first attachment location and is attached to the second ring at a second attachment location that is offset from the first attachment location.

Clause 20: The support structure of Clause 16, wherein the plurality of springs include a first cross-sectional area proximate to a junction of each spring and the first ring and a second cross-sectional area larger than the first cross-sectional area proximate to a junction of each spring and the second ring.

In other embodiments, both the radial dimensions and the circumferential dimensions of the springs may vary across a support structure.

While embodiments have been described with respect to specific examples including presently preferred modes, those skilled in the art, given the benefit of this disclosure, will appreciate that there are numerous variations and permutations of the above described structures, systems, and techniques that fall within the spirit and scope of the present embodiments as set forth above. Thus, for example, a wide variety of materials, having various properties, i.e., flexibility, hardness, durability, and the like, may be used without departing from the present embodiments. Finally, all examples, whether preceded by "for example," "such as," "including," "e.g.," or other itemizing terms, or followed by "and the like" or "etc.," are meant to be non-limiting examples, unless otherwise stated or obvious from the context of the specification.

While various embodiments have been described, the description is intended to be exemplary, rather than limiting and it will be apparent to those of ordinary skill in the art that many more embodiments and implementations are possible that are within the scope of the present embodiments. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

What is claimed is:

1. A support structure for an article of footwear having an upper and an outsole, the support structure comprising:
   a torsion element having a central hub fixed for movement with the upper and an outer ring attached to the central hub, the outer ring being selectively rotatable relative to the central hub; and
   a compression element including a first ring fixed for movement with the outer ring, a second ring fixed for movement with the outsole, and a plurality of springs extending between and joining the first ring and the second ring, the plurality of springs permitting selective relative movement between the first ring and the second ring.

2. The support structure of claim 1, wherein the outer ring is attached to the central hub via a plurality of spokes radiating from the central hub.

3. The support structure of claim 2, wherein the plurality of spokes include a first cross-sectional area proximate to a junction of each spoke and the central hub and a second cross-sectional area smaller than the first cross-sectional area proximate to a junction of each spoke and the outer ring.

4. The support structure of claim 2, wherein the plurality of spokes include a decreasing cross-sectional area in a direction extending from the central hub to the outer ring.

5. The support structure of claim 1, wherein the plurality of springs are equally circumferentially spaced around the first ring and the second ring.

6. The support structure of claim 1, wherein the plurality of springs are angularly spaced around the first ring and the second ring.

7. The support structure of claim 1, wherein each of the plurality of springs is attached to the first ring at a first attachment location and is attached to the second ring at a second attachment location that is offset from the first attachment location.

8. The support structure of claim 1, wherein the plurality of springs include a first cross-sectional area proximate to a junction of each spring and the first ring and a second cross-sectional area larger than the first cross-sectional area proximate to a junction of each spring and the second ring.

9. The support structure of claim 1, wherein the plurality of springs include a decreasing cross-sectional area in a direction extending from the second ring to the first ring.

10. The support structure of claim 1, further comprising a compression base having an engagement surface that extends into the compression element.

11. The support structure of claim 10, wherein the compression base is one of a foam pad and a fluid-filled bladder.

12. The support structure of claim 10, wherein the engagement surface opposes the torsion element and is operable to engage the torsion element when the torsion element is moved toward the second ring of the compression element a predetermined distance.

13. A support structure for an article of footwear having an upper and an outsole, the support structure comprising:
   a torsion element having a central hub fixed for movement with the upper and an outer ring attached to the central hub via a plurality of spokes radiating from the central hub, the plurality of spokes permitting selective rotation of the outer ring relative to the central hub; and
   a compression element including a first ring fixed for movement with the outer ring, a second ring fixed for movement with the outsole, and a compression loading element operable to absorb forces associated with movement of the first ring toward the second ring, the first ring being selectively movable relative to the first ring when the torsion element is moved in a direction toward the second ring.

14. The support structure of claim 13, wherein the plurality of spokes include a first cross-sectional area proximate to a junction of each spoke and the central hub and a second cross-sectional area smaller than the first cross-sectional area proximate to a junction of each spoke and the outer ring.

15. The support structure of claim 14, wherein the plurality of spokes include a decreasing cross-sectional area in a direction extending from the central hub to the outer ring.

16. The support structure of claim 13, wherein the compression loading element includes a plurality of springs extending between and joining the first ring and the second ring, the plurality of springs permitting selective relative movement between the first ring and the second ring.

17. The support structure of claim 16, wherein the plurality of springs are equally circumferentially spaced around the first ring and the second ring.

18. The support structure of claim 16, wherein the plurality of springs are angularly spaced around the first ring and the second ring.

19. The support structure of claim 16, wherein each of the plurality of springs is attached to the first ring at a first attachment location and is attached to the second ring at a second attachment location that is offset from the first attachment location.

20. The support structure of claim 16, wherein the plurality of springs include a first cross-sectional area proximate to a junction of each spring and the first ring and a second cross-sectional area larger than the first cross-sectional area proximate to a junction of each spring and the second ring.

* * * * *